United States Patent
Mdeway

(10) Patent No.: US 10,803,528 B2
(45) Date of Patent: Oct. 13, 2020

(54) CONSUMER-CENTERED RISK ANALYSIS AND INSURANCE PURCHASING SYSTEMS AND METHODS

(71) Applicant: Nader Mdeway, Austin, TX (US)

(72) Inventor: Nader Mdeway, Austin, TX (US)

(*) Notice: Subject to any disclaimer, the term of this patent is extended or adjusted under 35 U.S.C. 154(b) by 121 days.

(21) Appl. No.: 16/006,284

(22) Filed: Jun. 12, 2018

(65) Prior Publication Data

US 2018/0293665 A1    Oct. 11, 2018

Related U.S. Application Data

(63) Continuation of application No. 14/319,215, filed on Jun. 30, 2014, now Pat. No. 9,996,881.

(60) Provisional application No. 61/841,694, filed on Jul. 1, 2013.

(51) Int. Cl.
    *G06Q 40/08* (2012.01)
    *G06Q 10/06* (2012.01)

(52) U.S. Cl.
    CPC ......... *G06Q 40/08* (2013.01); *G06Q 10/0635* (2013.01)

(58) Field of Classification Search
    CPC ........ G06Q 10/00; G06Q 20/00; G06Q 30/00; G06Q 40/00
    USPC ...................................................... 705/3–44
    See application file for complete search history.

(56) References Cited

U.S. PATENT DOCUMENTS

| | | | | |
|---|---|---|---|---|
| 7,395,219 B2 * | 7/2008 | Strech | ................... | G06Q 40/08 705/4 |
| 8,005,734 B1 * | 8/2011 | Strech | ................... | G06Q 40/08 705/35 |
| 8,566,127 B1 * | 10/2013 | Strech | ................... | G06Q 40/08 705/35 |
| 8,666,786 B1 * | 3/2014 | Wirz | ..................... | G06Q 40/08 705/30 |

(Continued)

OTHER PUBLICATIONS

Pauly et al., "Information Technology and Consumer Search for Health Insurance", Int. J. of the Economics of Business, vol. 13, No. 1, pp. 45-63, Feb. 2006.*

*Primary Examiner* — Frantzy Poinvil
(74) *Attorney, Agent, or Firm* — Lauff Law PLLC

(57) ABSTRACT

Systems and methods are provided for insurance risk analysis, insurance policy comparisons, benchmarking, and purchasing. A consumer-focused interview may be used. Conversation-style user interviews may be used, and interviews may be augmented with cognitive techniques. Interview topics may include consumer lifestyle, activities, possessions, and objectives, and other information pertinent to insurable risks. A data import-export engine may be provided to import data from various insurance companies, departments of insurance or data warehouses. Entered, imported, and/or previously stored data may be used to produce one or more of a risk profile report, a risk analysis, a recommended coverage report, a policy download, a gap analysis report, a comparison report of multiple proposals from multiple insurance companies, a policy forms analysis, a policy forms analysis comparison, and/or a benchmark report. Apparatuses and method may include modules for accounting, marketing, communication, consumer and prospect tracking and documentation, and/or insurance and risk management education.

4 Claims, 19 Drawing Sheets

(56) References Cited

U.S. PATENT DOCUMENTS

| | | | | |
|---|---|---|---|---|
| 8,744,881 B2* | 6/2014 | Reid | ............... | G06Q 30/06 |
| | | | | 705/35 |
| 9,996,881 B2* | 6/2018 | Mdeway | ............ | G06Q 40/08 |
| 2002/0055862 A1* | 5/2002 | Jinks | ............... | G06Q 40/08 |
| | | | | 705/4 |
| 2003/0139948 A1* | 7/2003 | Strech | ............. | G06Q 40/00 |
| | | | | 705/4 |
| 2009/0210256 A1* | 8/2009 | Upadhyayula | ...... | G06Q 40/08 |
| | | | | 705/4 |
| 2011/0307277 A1* | 12/2011 | Cruz | ............... | G06Q 30/02 |
| | | | | 705/4 |
| 2015/0187015 A1* | 7/2015 | Adams | ............ | G06Q 40/08 |
| | | | | 705/4 |
| 2018/0293665 A1* | 10/2018 | Mdeway | ............ | G06Q 40/08 |

* cited by examiner

| File | Tools | Risk Profile | Recommended Proposal | Help |

General Information Section (500):
    Hi Vicky,
    My name is Ira and I am here to help you make sure that you are insured properly.
    While I am fairly young, I am very wise. Please introduce yourself.
    First Name (501): [_____]
    Middle Name (502): [_____]
    Last Name (503): [_____]
    Date of Birth (504): [_____]
    Marital Status (505): [_____]

Backward                                             Forward

FIG. 5

| File | Tools | Risk Profile | Recommended Proposal | Help |

Import Policy Data (600):
    For accurate information and ease of use, it is highly recommended that we import
    your policy data. In some instances this is not possible. In such case, you will be
    notified and you will be provided an opportunity to enter the data manually.
    Would you like to import your policy data?
        ☐ Yes         ☐ No Or would you prefer to upload your policy file?    [Upload]

Backward                                             Forward

FIG. 6

| File | Tools | Risk Profile | Recommended Proposal | Help |

Import Policy Data (700):
    In order to import your policy data please tell me about your policy information:
    Insurance Company (701):
    Policy Number (702):
    Social Security Number (703):
    Policy Premium at Inception (704):
    Policy Effective Date (705):

Or would you prefer to upload your policy file?   [Upload]

Backward             Forward

FIG. 7

| File | Tools | Risk Profile | Recommended Proposal | Help |

ABC Insurance Company, Inc. Policy Number ABC00001 Declaration Page (800):
Thank you, Alice. You have imported your policy data successfully. If needed, please select EDIT or MISSING to correct any of the imported data.

| Business Owner's Insurance Policy Details ||
|---|---|
| Each Occurrence limit: | $1,000,000 |
| General Aggregate Limit: | $1,000,000 |
| Products and Completed Operations Limit: | Missing |
| Damage To Premises Rented To You Limit: | $100,000 |
| Medical Expenses Limit: | $5,000 |
| Business Personal Property Limit: | $100,000 |
| Business Personal Property Deductible: | $300,000 |
| List of Policy Forms: | ABC00001-1 (01/01) General Liability<br>ABC00001-2 (01/00) Property Special Form |

Edit　　　　Backward　　　　Forward

FIG. 8

| File | Tools | Risk Profile | Recommended Proposal | Help |

ABC Insurance Company, Inc. Policy Number ABC00002 Summary of Benefits (900):
Thank you, Anise. You have imported your policy data successfully. If needed, please select EDIT or MISSING to correct any of the imported data.

| Medical Insurance Policy Details | | |
|---|---|---|
| Policy Coverages | | Value |
| Lifetime Maximum | | Unlimited |
| Coinsurance | | 80% |
| Individual Deductible | | $1000 |
| Family Deductible | | $3000 |
| Coinsurance Maximum | | $3000 |
| Office Visit Copay | | $10 |
| Emergency Room Copay | | $100 |
| Prescription Drugs Copay | Generic / Tier 1 | $10 |
| | Preferred Brand / Tier 2 | $20 |
| | Non-Preferred / Tier 3 | $30 |
| | Specialty / Tier 4 | $40 |
| Policy Riders | | None |
| Policy Form | | ABC00002 (01/01) |

Edit　　　　　　　　Backward　　　　　　　　Forward

FIG. 9

| File | Tools | Risk Profile | Recommended Proposal | Help |

ABC Insurance Company, Inc. Policy Number ABC00003 Declaration Page (1000):
Thank you, Linda. You have imported your policy data successfully. If needed, please select EDIT or MISSING to correct any of the imported data.

| Auto Insurance Policy Details | |
|---|---|
| Policy Coverages | Limits |
| Liability Per Person | $100,000 |
| Liability Per Accident | $300,000 |
| Liability Property Damage | Missing |
| Personal Injury Protection | $2,500 |
| Uninsured / Underinsured Motorist Liability Per Person | $100,000 |
| Uninsured / Underinsured Motorist Liability Per Accident | $300,000 |
| Uninsured / Underinsured Motorist Liability Property Damage | $100,000 |
| Collision Deductible | $100 |
| Comprehensive Deductible | $100 |
| Towing | Missing |
| Rental Per Day | $30 |
| Rental Total | $900 |
| Driver's Excluded | None |
| Policy Form | ABC00003 (01/01) |

Edit     Backward     Forward

FIG. 10

| File | Tools | Risk Profile | Recommended Proposal | Help |

Summary of Imported Data Report (1100):
Thank you, Teresa. You have imported your policy data successfully. However, some data may be missing. You may use the links in the User Action below to edit any missing data.

| Summary of Imported Data Report ||||||
|---|---|---|---|---|
| Institution or Insurance Company | Policy Number | Downloaded Data Completeness Percentage | Edited Data Percentage | User Action |
| ABC Insurance Company | ABC00001 | 100% | 2% | None |
| BCD Insurance Company | BCD00001 | 0% | 0% | Data Input is Required |
| XYZ Data Warehouse | XYZ0001 | 50% | 0% | Optional |

| Edit | Backward | Forward |

FIG. 11

| File | Tools | Risk Profile | Recommended Proposal | Help |

Summary of Imported Data and Identified External Sources (1200):
Thank you, Jim. You have imported your policy data successfully. Shown below is a list of sources and associated policy parameters. However, some data may be missing. You may click on hyperlinks to edit data.

| Summary of Imported Data By Source | | | |
|---|---|---|---|
| Policy | Data Type | Value | Source |
| General Liability | Named Insured | ABCXYZ Company | ABC Data Warehouse Company |
| General Liability | Policy Number | 123456 | User |
| General Liability | Effective Date | 01/02/2000 | ABC Insurance Company |
| General Liability | General Liability Aggregate Limit | $1,000,000 | ABC Insurance Company |
| General Liability | General Liability Each Occurrence Limit | $1,000,000 | User |
| Property | Named Insured | ABCXYZ Company | XYZ Insurance Company |
| Property | Policy Number | 2345678 | XYZ Insurance Company |
| Property | Effective Date | 01/02/2000 | XYZ Insurance Company |
| Property | Building Limit | $100,000 | User |
| Property | Business Personal Property Limit | $1,000 | XYZ Insurance Company |
| Umbrella Liability | Named Insured | ABCXYZ Company | ABC Data Warehouse Company |
| Umbrella Liability | Policy Number | 3456789 | ABC Data Warehouse Company |
| Umbrella Liability | Effective Date | 01/02/2000 | ABC Data Warehouse Company |
| Umbrella Liability | Aggregate Limit | $1,000,000 | ABC Data Warehouse Company |

| Edit | Backward | Forward |

FIG. 12

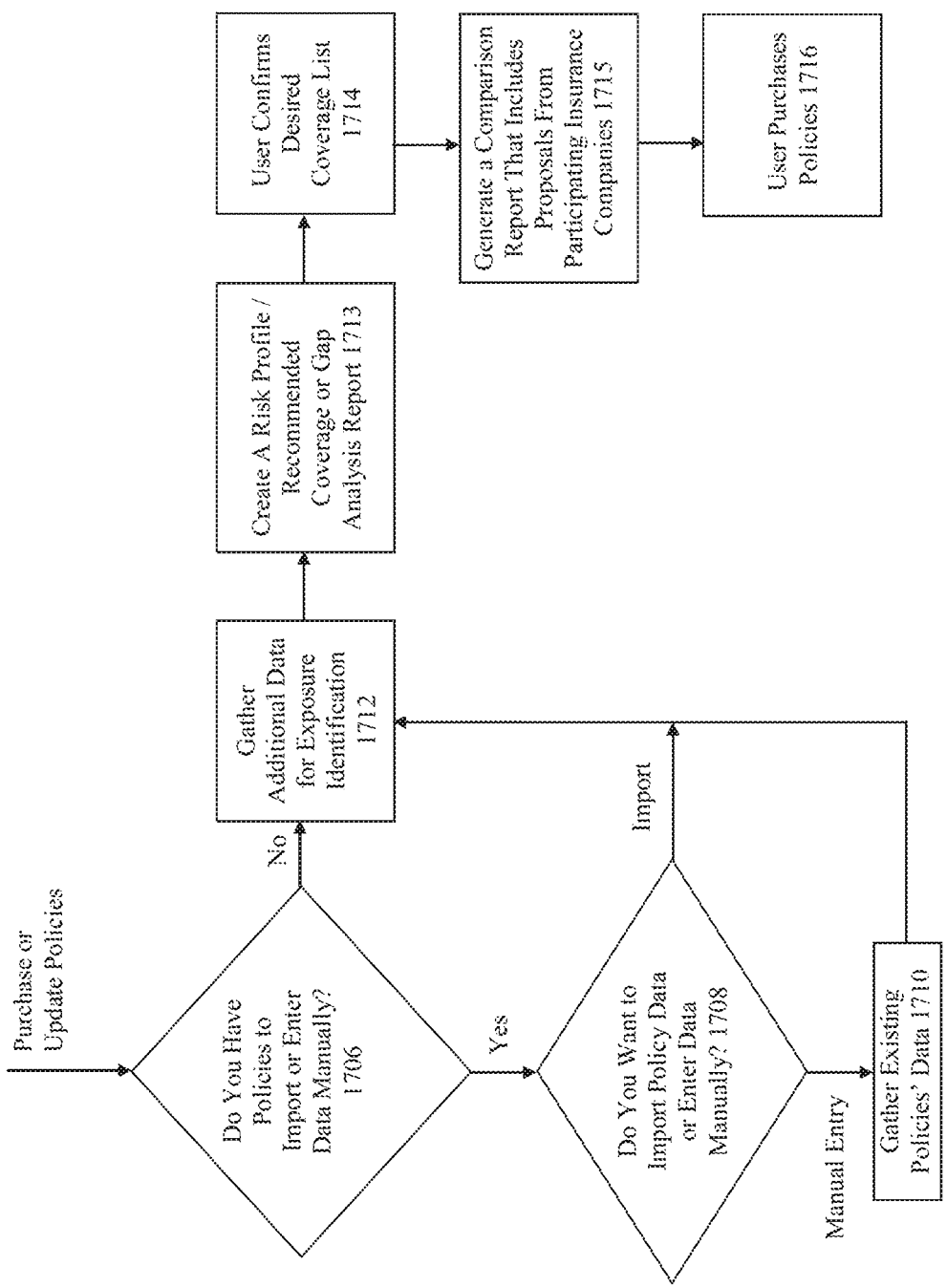
FIG. 17.1

| File | Tools | Risk Profile | Recommended Proposal | Help |

Recommended Insurance Proposals (1800):

| Recommendation Results | | | First Choice – Meets Recommendation | Second Choice – Does NOT Meet All Recommended Coverages |
|---|---|---|---|---|
| Premium | | | $1700 | $1400 |
| Recommended Coverage | Recommended Minimum Coverage Limit | Priority | ABC Insurance Company | XYZ Insurance Company |
| Dwelling Coverage Perils and Limit | Open Perils at Replacement Cost $400,000 | 1 | Open Perils at Replacement Cost $400,000 | Open Perils at Replacement Cost $400,000 |
| Personal Property Coverage Perils and Limit | Open Perils at Replacement Cost $250,000 | 1 | Open Perils at Replacement Cost $250,000 | Named Perils at Replacement Cost $200,000 |
| Deductible | $5,000 | 3 | $5,000 | $5,000 |
| Other Structures | $100,000 | 2 | $100,000 | $80,000 |
| Loss of Use | $150,000 | 2 | $150,000 | $100,000 |
| Personal Liability | $1000,000 | 1 | $1000,000 | $500,000 |
| Medical Payments | $5,000 | 1 | $5,000 | $5,000 |
| Water Damage Endorsement | $100,000 | 1 | $100,000 | $50,000. Water Damage is covered if discovered and reported within 14 days. |
| Constant and Repeated Water Damage Coverage | Recommended | 2 | Included | Not Available |
| Sewer or Drain Backup | $25,000 | 2 | Included | Included, but only if it originates from inside premises. |
| Foundation Coverage | Recommended $25,000 | 1 | Included | Included, but does not include the cost of replacement parts below foundation. |
| Jewelry | Agreed Value at $2,500 | 1 | Agreed Value at $2,500 Endorsement ABC-001 | The Least of Actual Cash Value or Replacement Cost at $2,500. Endorsement XYZ-001 |
| Business Personal Property | $10,000 | 1 | $10,000 | $10,000 |
| Mold Coverage | $50,000 | 2 | Included up to $100,000 | Included up to $5,000, but only if caused by specific and limited perils. |
| Discounts Available | | | Multi-policy, No Loss, Sprinkler System | No Loss, Sprinkler System |
| Umbrella | $1,000,000 | 1 | $1,000,000 | $1,000,000 |

FIG. 18

| File | Tools | Risk Profile | Recommended Proposal | Help |

Policy Forms Analysis (1900):
    Please tell me about the policy forms you would like to analyze:
    Insurance Company (1901): [_____]
    Form Number (1902): [_____] [Add]
    Version Date (1903): [_____] [Add]
    Title (1904): [_____] [Add]
    What is your question today, Mike? [_____]

Or would you prefer to upload your policy file? [Upload]

Backward        Forward

FIG. 19

| File | Tools | Risk Profile | Recommended Proposal | Help |

Policy Forms Analysis (2000):

ABC001 01/2000 Insuring Agreements:
    1. Technology Professional Liability:
        ABC Company, Inc. pays for Damages or Claim Expenses in excess of the
        Retention (deductible) that are within the policy limits for wrongful acts
        committed in the process of performing your Professional Services.
    2. Network Security and Privacy Liability
        ABC Company, Inc. pays for Damages or Claim Expenses, in excess of the
        Retention (deductible) that are within the policy limits for which the insured is
        legally obligated to pay for errors or omissions committed by the insured in the
        course of providing or managing Computer Systems security that result in Theft of
        Data. Notice the term "legally obligated to pay" in the previous sentence.

Backward        Forward

FIG. 20

| File | Tools | Risk Profile | Recommended Proposal | Help |

Comprehensive Policy Forms Comparison Analysis (2100):
Tony, which forms would you like to compare today?

|  | Form 1: | Form 2: | Form 3: |  |
|---|---|---|---|---|
| Insurance Company (2191): | ☐ | ☐ | ☐ | [Add] |
| Form Number (2102): | ☐ | ☐ | ☐ | |
| Version Date (2103): | ☐ | ☐ | ☐ | |
| Title (2104): | ☐ | ☐ | ☐ | |

Or would you prefer to upload your policy file?   [Upload]

Backward        Forward

FIG. 21

CONSUMER-CENTERED RISK ANALYSIS AND INSURANCE PURCHASING SYSTEMS AND METHODS

CROSS-REFERENCE TO RELATED APPLICATIONS

This application is a continuation of U.S. application Ser. No. 14/319,215 filed on Jun. 30, 2014, and issuing as U.S. Pat. No. 9,996,881 on Jun. 12, 2018. This application claims the benefit under 35 U.S.C. § 119(e) of U.S. Provisional Patent Application Ser. No. 61/841,694 filed Jul. 1, 2013, through U.S. patent application Ser. No. 14/319,215. application Ser. No. 14/319,215 and Application Ser. No. 61/841,694 are incorporated herein by reference.

BACKGROUND

Various embodiments of this disclosure relate generally to various aspects and combinations of risk analysis, risk exposures identification, policy download, recommendation of solutions to insure risk exposures, gap analysis, purchasing of insurance policies, the comparison of insurance policies, benchmarking, accounting, marketing to and communicating with consumers, tracking of consumers' and prospects' transactions, and insurance and risk management education.

Presently, the purchase of insurance is generally transacted when consumers contact an insurance professional or enter personal information about a certain risk on-line in a software program and receive an estimated cost of a policy with little regard to their risk profile and whether the coverage offered addresses their protection needs. In this description, the "user" and the "consumer" are assumed to be the same person. However, this need not be so. A consumer may authorize another person, for example an insurance professional or a financial advisor, to assist the consumer in purchasing insurance. For convenience, the discussions in this disclosure will assume that the user and consumer are the same person or entity and that the consumer and the insured are the same person or entity, but it should be understood that the scope of such discussions are not limited to that situation.

Even in cases where a consumer contacts an insurance professional there is a huge variance in the professional education and care that insurance professionals possess or offer. Typically, the information solicited from consumers addresses the insurance companies' underwriting needs regarding items such as locations, models of autos, square footage of homes, height and weight of individuals, or coverage limits required. This information is then entered into a software program and a premium is estimated based on insurance companies' underwriting criteria and any selection of coverages the insurance professional or consumer chooses. Because generally this method does not evaluate the consumer's needs in much detail, often consumers purchase policies that do not provide adequate protection and without any understanding of the impact of the coverages on their well-being at the time of loss. In addition, unless the insurance professional is educated on the various policy forms and is thorough in asking the consumer the right questions, a failure to perform a thorough risk analysis profile of the consumer may occur and inappropriate coverage or inaccurate data may be used to classify some aspects of the operation of consumers.

To avoid discovering the lack of a desired coverage when a claim is reported by consumers, and to assist consumers and insurance professionals in the proper evaluation of the consumer's risk profile prior to purchasing an insurance policy, there is tremendous need for systems and methods that performs risk analysis based on factors such as the consumer's lifestyle, possessions, contractual obligations, number of dependents, or profession, and to provide an opportunity to educate users not only about the cost and major limits of the recommended insurance policy, but also about the coverages provided from multiple insurance companies proposed in the comparison and alerting consumers to any identified coverage gaps and inadequacies not addressed by the policies presented.

In some existing systems where software attempts to perform the functions of insurance professionals in making product recommendations, the process is product-focused and not consumer-focused. In other words, the consumer would first have to identify his or her own need for a product or coverage and then search for the best product or coverage match utilizing the existing art. In this process, if the consumer is not aware of the existence of a risk in their profile or does not understand the full implication of lack of coverage, or if the consumer is not aware of the existence of a product, the existing systems cannot help the consumer. Existing systems do not create a risk profile of the consumer and do not make the consumer aware of his or her insurance needs. Furthermore, the existing systems do not alert the consumer to existing gaps in coverage in their insurance program or analyze or compare policies.

In some embodiments of the present disclosure, a system starts with first identifying the consumer's needs based on the information provided during the interview. It alerts the consumer to needs of which he or she may or may not be aware and then recommends the products that best address the consumer's needs. In some embodiments of the present disclosure, a benchmark report may be formulated comparing the user's selection of policy coverage against the selection of other consumers with similar characteristics.

It has been observed about the existing methods of purchasing insurance that once a consumer provides information for quotes or to purchase a policy, including those policies purchased online, the information provided is no longer readily available to the user for use again with other insurance companies. Every time a consumer attempts to purchase insurance, they are required to re-enter or provide the desired and/or existing coverage information again and again. This process is prone to data entry errors and consumers often rely on memory when asked about desired coverage. In addition, consumers often do not understand the meaning of some or all of the insurance terms.

In some embodiments of the present disclosure, a data structure containing consumer's information, including existing policy information and pertinent modifications, may be created and stored in a system. This, for example, may be created and stored in a system, including by accessing data structures and information in the current insurance company's database or a data warehouse and downloading it into the system. Thereby, as consumers' needs change, the impact of the change on their risk profile may be detected.

Existing insurance purchasing systems also do not enable users to consistently and reliably maintain good records of the changes to their insurance programs year after year. The existing systems do not capture or respond to users' life or business changes as a function of time. As consumers' needs change, the full impact of the change on their risk profile is often undetected.

In some embodiments of the present disclosure, a system may maintain the data entered with a time stamp and any changes that occur may be entered to update the risk profile of the consumer, with a new recommendation being generated regarding coverage for any new risk exposures. Ultimately, a chronological report that tracks recommended and/or implemented changes of coverages may be made available to the user.

Some existing systems perform calculations for a specific product, life insurance for example. However, no significant attention is focused on the client beyond limits of insurance.

In some embodiments of the present disclosure, a system may address multiple insurance products and begin with the consumer's insurance needs and the various policy features that best suit the consumer.

Some existing systems provide multiple claim scenarios to be selected by the user with a recommended coverage and coverage disparity displayed in comparison to an existing policy. However, those systems do not evaluate the insured's needs or create a risk profile for the user for a proper comparison to be made between the consumer's needs and any existing coverage. Selecting coverage based on a claim's scenario does not address the consumer's needs in a comprehensive manner. For example, choosing a claim scenario for an auto accident may provide information about the limits that a consumer should choose should this scenario occurs. However, until and unless comprehensive data is gathered about the consumer such as lifestyle, possessions, or net worth, a proper risk exposure identification and consequently a proper insurance coverage recommendation cannot be made.

Many existing insurance rating systems may be summarized by the simplified illustration of FIG. 1. At the beginning of interview 101, the user has the opportunity to enter information such as name, address, date of birth, among other personal characteristics necessary to underwrite the policy 102. This is followed by the consumer or the user entering the desired coverage 103. Finally, the system provides an estimated premium provided that the consumer meets certain assumptions such as no moving vehicle violations or no further health complications.

SUMMARY

Typically, a consumer maintains a relationship with one or more insurance companies. An example of an insurance company is any entity that offers consumers a contract (e.g., an insurance policy) which transfers a consumer's (insured's) risk to itself in return for a premium paid. A consumer has a relationship with an insurance company if the insurance company insures the consumer as evidenced by an insurance policy.

Various embodiments of this disclosure provide methods and systems for various combinations of risk profile creation, risk analysis, insurance coverage recommendation, policy download, gap analysis report identification, insurance policy purchasing, insurance policies language analysis and comparison, benchmarking, accounting, marketing, communication and coverage notification, clients and prospects tracking, insurance education, and agent selection. Various embodiments use a computer system and/or a computer network. Various embodiments of this disclosure develop and take into account the risk profile of a consumer in order to provide various risk analysis reports including, for example, recommended coverage proposals and gap analysis reports specific to the consumer. Various embodiment of this disclosure may include an interview process that solicits data from a user by inquiring about the consumer and the consumer's relationship with insurance companies, among others, for purposes such as performing gap analysis, confirming the existence of or lack of a certain coverage in an existing or to-be-purchased insurance policy, benchmarking, comparing or replacing policies, and/or the assistance with purchasing additional coverages. In some embodiments, a system may be accessed and used by multiple users at the same time. The interview process in various embodiments may have a user enter data using a keyboard or voice recognition software to make a selection, but other means, methods, and/or devices may be used to obtain input by a user.

During an interview process, a user answers questions for the purpose of identifying their risk exposures and the creation of their risk profile. For example, a consumer may be asked about their net worth, the ownership of multiple homes, type of business, or if they have any health complications. Information about consumers, including their existing and/or proposed policy information data, is stored and used to create a risk profile for each consumer. Processing of the available consumer data and responses gathered during the interview enables various embodiments of this disclosure to recommend insurance proposals that insure the consumer for exposures identified by such embodiments and/or those identified by the user. If a consumer already has a policy in place, various embodiments of this disclosure may compare the current policies' coverages with the recommended coverages. The resulting comparison is called coverage gap analysis.

In some embodiments, in order to make the interview process as efficient as possible, a consumer default risk profile may be employed. The basic assumptions defining the default profile enable some embodiments of this disclosure to streamline the insurance risk analysis and policy purchasing process for new users by asking fewer questions, instead of requiring the user to re-enter data that has not changed or to enter data that is indirectly identified during the interview process. In addition, when a user updates the default profile, the updates may be stored and made available for further analysis or for returning users. A summary of skipped topics may be provided to the user to mitigate inadvertent omission of data. For new users, the default profiles may be used initially to focus the interview according to the most likely areas of relevance for a particular user based on the consumer's status, which may include but is not limited to age, net worth, health conditions, occupation, possessions, business operations, etc. while at the same time ensuring that accurate proposals are prepared for all consumers including those that do not fit the standard profile. In some embodiments, this default profile may be associated with a set of minimally recommended coverages and limits to be used in the analysis reports presented.

Various embodiments of this disclosure may provide the users, whether individuals or businesses, with multiple risk profile determination options. At a minimum, in some embodiments a user may be given the options of determining their comprehensive risk exposures profile or product-specific risk exposures profile. If the option of a comprehensive risk exposures profile is chosen, various embodiments of this disclosure will interview the user for the purpose of determining all of the consumer's insurance needs. In some embodiments, depending on the user's selection, a recommendation of multiple insurance policies that address the user's needs may then be presented. If the option of a product-specific risk exposures profile is chosen, various embodiments of this disclosure will interview the user for the purpose of determining the consumer's need for that specific product and may present a recommendation for that specific product. For example, during the process of a comprehensive risk analysis various embodiments of this disclosure may recommend home, auto, umbrella, health, life, and disability insurance coverages. Another example of product-specific risk exposures analysis may be a recommendation for home and umbrella policy coverages only. In either option and depending on the user's selection, various embodiments of this disclosure may provide all other reports including coverage gap analysis reports outlining lack of or insufficient insurance coverage in existing policies, and may enable the user to purchase additional coverages or one or multiple policies that meet the insured's risk exposures.

In some embodiments, a user may be able to select desired coverages from a list of recommended coverages. Based on the selection, various embodiments of this disclosure may provide premium and coverage comparisons from multiple insurance companies, and may offer comparisons where coverages may be offered in one or more countries. The user may then be offered the option of choosing the desired insurance policies, select insurance agents associated with the insurance companies and/or purchase one policy or multiple policies at the same time. Furthermore, an insurance coverage recommendation report and multiple policy comparisons may be presented to the user.

Utilizing various embodiments of this disclosure, consumers may receive insurance data in a multitude of methods. For example, in some embodiments, during an interview process a user enters information about the insurance policies the user has. In some other embodiments, a user uploads policy files, provides a list or selects from a list the insurance companies with the consumer's existing policy identifying information, and the policies' data may be retrieved directly from the insurance companies. In other embodiments, the user provides a list of insurance companies with policy identifying information and the policies data is retrieved directly from a source housing the policies data other than directly from the insurance companies.

In some embodiments, data (which may include policy data) may be imported at any time from a variety of sources using a data import-export engine (DIEE). Import sources may include, but are not limited to, insurance companies, data warehouses, policy holders, departments of insurance, and the like. Data imported from various sources into various embodiments of this disclosure may be checked for completeness and may be formatted to meet a set of standards. Imported data may be assigned to specific fields tabulated in databases in preparation for further usage in the analysis. This set of electronic data, standards, tables, and databases (among others) representing the coverage offered by an insurance policy may be called a Policy Signature file. In some embodiments, a Policy Signature file is an electronic data file which not only contains the policy limits, but also a comprehensive list of policy coverages. For example, an insurance policy may provide coverage for "direct physical loss." In this case, the electronic data file would include a multitude of common direct physical loss examples and situations. This type of data may be presented in an easy to understand format when a user asks questions such as "Is my furniture covered in case of fire?" In various embodiments, the answer would be yes (assuming no other exclusions exist) because fire is generally considered a direct physical loss. In some embodiments, missing or incomplete data may be brought to the user's attention for further processing prior to being incorporated in a report or analysis. In some embodiments, data may be imported throughout the interview process by connecting to data sources on an as needed basis. Some embodiments allow data for an unlimited number of policies to be downloaded into and hosted for each user.

Users have a number of options available, some of which are described above, when utilizing various embodiments of this disclosure. In the event a user decides to proceed with either improving existing policy coverages or purchasing a new policy, the user in some embodiments may be presented with a comparison report of premiums and coverages of multiple policies from multiple insurance companies that meet the need of the consumer. This report may include a gap analysis report which includes a list of deviations in these existing policies from any recommended policy language. For example, if the recommended language for a home insurance policy is "Open Perils" for dwelling and company XYZ offers only "Named Perils" language, various embodiments of this disclosure will alert the user to this deviation from the recommended coverage. Based on the data gathered during the interview process and the user's selection, insurance companies that do not offer the type of coverage required or that provide inferior coverage are automatically rejected, and in some embodiments the user may elect to be informed of the reason for rejection. In some embodiments, once the user selects the desired coverage, lists of policy forms and a comparison of policy forms may also be presented for those policies. The user in some embodiments may then choose an insurance company from which to purchase insurance. In addition, various embodiments of this disclosure may propose lists of insurance agents associated with the insurance company based upon certain criteria such as city state or zip code, or a professional designation, years of experienced, on-line reviews, multiple company appointments, for example Travelers AND The Hartford AND Aetna, association memberships, and the like. In some embodiments, the user may purchase the policy directly or with the help of professional assistance, live or otherwise. Some embodiments allow consumers to contact insurance professionals by various means such as chat, email, texting, social media, or phone.

As used in this disclosure, the term "Super Rater" refers to systems and/or methods capable of automatically calculating the lowest possible premiums of multiple policies from multiple insurance companies for selected coverages given a set of information required for underwriting a risk. For example, if a couple desires to purchase a home insurance policy and if an insurance company determines the premium based on the insurance score of the insureds, a Super Rater will automatically use the insurance score of the individual that provides the lowest possible premium without user intervention. A conventional rater is one where a user enters the first-named insured and the co-applicant's name, orders the insurance score, and rates the policy to determine the premium. The user would then have to swap the first-named insured and co-applicant's name, re-order the insurance score for the now new first-named insured, and then rate the policy to determine if a lower premium applies. If the premium in the second method is higher, the user would have to swap the first-named insured and co-applicant again to apply the lowest applicable premium. Another example of a Super Rater is one that automatically determines if multi-policy discount or other types of discounts do or do not apply based on information already gathered during the interview. For example, if a user is requesting the purchase of a home insurance policy and an auto insurance policy, a Super Rater may automatically apply the companion-policy discount. In any event, a Super Rater may present the user with discount options to be confirmed by the user and inform the user with the applied discounts. A Super Rater also abides by general underwriting requirements. For example, if an insurance company does not insure homes over 50 years of age and the consumer's home is over 50 years of age, that company may not be part of the recommended proposals.

Various embodiments of this disclosure may serve as a policy analysis tool and policy forms comparison library for insurance professionals, risk managers, and/or users. Such tools and/or libraries may be presented to the user in a plurality of methods. In other embodiments, a user may choose to start the policy form comparison using the interview process to analyze the needs of a consumer. In other embodiments, the user may be provided with the option to select and compare specific policy forms from specific insurance companies. Based on the answers provided by the user and the user's selection of the topics of interest, various embodiments of this disclosure may provide a comparison of policy forms that address the user's points of interest. For example, an insurance professional or a risk manager may desire to understand if certain policy forms provide coverage to an insured, in this case a business, for work performed by its subcontractors, and whether the policy forms provide coverages such as Network Security, Privacy Liability, Multi-media and Content Liability. For this, in some embodiments the user selects Subcontractors, Network Security, Privacy Liability, and Multi-media and Content Liability as the topics of interest and selects the insurance companies and specific policy forms offered by these insurance companies. Then various embodiments of this disclosure may perform a comparison analysis and provides the user with a report educating the user on the coverages offered to the insured and whether coverage exists in these policy forms or not. Furthermore, the report may provide links to the policy forms for the user's own education and analysis. In some embodiments, the user has the option to view the advice and guidance or tips offered during the interview process. For example, when requesting Named Insured information for a property insurance policy, various embodiments of this disclosure may offer suggestions on who is advisable to be a Named Insured. For a property insurance policy, in many circumstances all property owners should be Named Insureds, and those who only have interest in the property, such as lenders, should be listed as Mortgagees or Loss Payees as the case may be.

In some embodiments users, insurance professionals, or risk managers may choose to view a comprehensive analysis performed for selected policy forms. For this, various embodiments use a policy forms database to compare all or selected coverages of interest for the insurance professionals and consumers. For example, some of the predetermined coverages may be policy insuring agreements, types of forms such as occurrence, claims made or claims made and reported, definition of certain key insurance terms, and main coverages included in these policy forms. When applicable, the comparison may list a form's uniquely identifying information such as each policy form number and revision date.

Some embodiments may track marketing, communication, clients and prospects in various ways. For example, some embodiments maintain a full accounting record of executed transactions and communications. In some embodiments, insurance professionals may send risk analysis reports, proposals, marketing and communication letters and reminders, and other information directly to consumers from the embodiment. In some embodiments, professionals may compare the language of multiple policies, and communicate coverage related information with consumers.

Various embodiments of this disclosure may be designed to abide by all legal and insurance regulation requirements as dictated by each state and country. For example, the auto insurance minimum liability limits may be different in each state in the United States of America. Therefore, should a user select limits below those required, various embodiments of this disclosure will alert the user with the minimum limits required in the state where coverage is desired.

BRIEF DESCRIPTION OF THE DRAWINGS

This disclosure is supplemented by the drawings of FIGS. 1-21, in which:

FIG. 5 illustrates a user interface example of an introductory step during the interview process;

FIG. 6 illustrates a user interface presentation of a policy data import request;

FIG. 7 illustrates a somewhat advanced step of the policy data import process;

FIG. 8 depicts a view of downloaded business owners' policy data parameters;

FIG. 9 depicts a view of downloaded medical insurance policy data parameters;

FIG. 10 depicts a view of downloaded auto insurance policy data parameters;

FIG. 11 depicts, in some embodiments, a summary report of downloaded policy data;

FIG. 12 depicts a summary report of downloaded policy data by import source;

FIG. 18 depicts a comparison report of the recommended insurance coverages and policies during the policy purchasing process;

FIG. 19 depicts a policy forms analysis user interface view at an initial step during the interview process;

FIG. 20 depicts an example of a policy form analysis report; and

FIG. 21 depicts a policy forms comparison analysis user interface view at an initial step during the interview process.

DETAILED DESCRIPTION OF VARIOUS EMBODIMENTS

The discussions below provide specific details and generally describe various components and steps of various embodiments of this disclosure. However, embodiments of this disclosure may not have all of these specific details and/or may use various combinations of some or all of these specific details. The structures and methods described herein may be implemented in devices, systems, and software other than the examples set forth. In other instances, conventional or otherwise well-known structures, devices, methods and techniques are referred to schematically or shown in block diagram form, or may be referred to generically, in order to facilitate description of various embodiments of this disclosure to those of skill in the art already familiar with such structures, devices, methods and techniques. Various structures, devices, methods and techniques may be depicted and/or described individually for clarity of discussion, but such depiction and/or description is not intended, and should not be understood, to exclude the inclusion of such structures, devices, methods and techniques in other structures, devices, methods and techniques.

Various embodiments of this disclosure may include structures and/or steps that may be embodied in machine-executable software instructions, and may include structures and/or steps that are implemented as a result of one or more processors and/or memory storage device executing such instructions. In other embodiments, hardware elements may be employed in place of, or in combination with, software instructions to implement a system.

Overview

Figure 1:
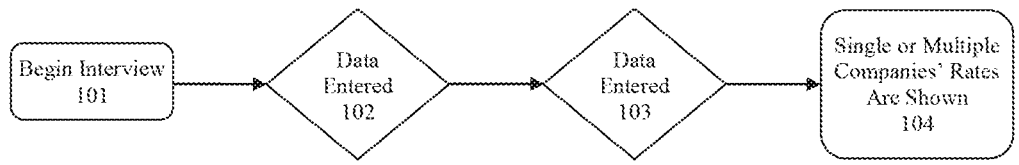
FIG. 1 depicts a previous method.
Figure 2:
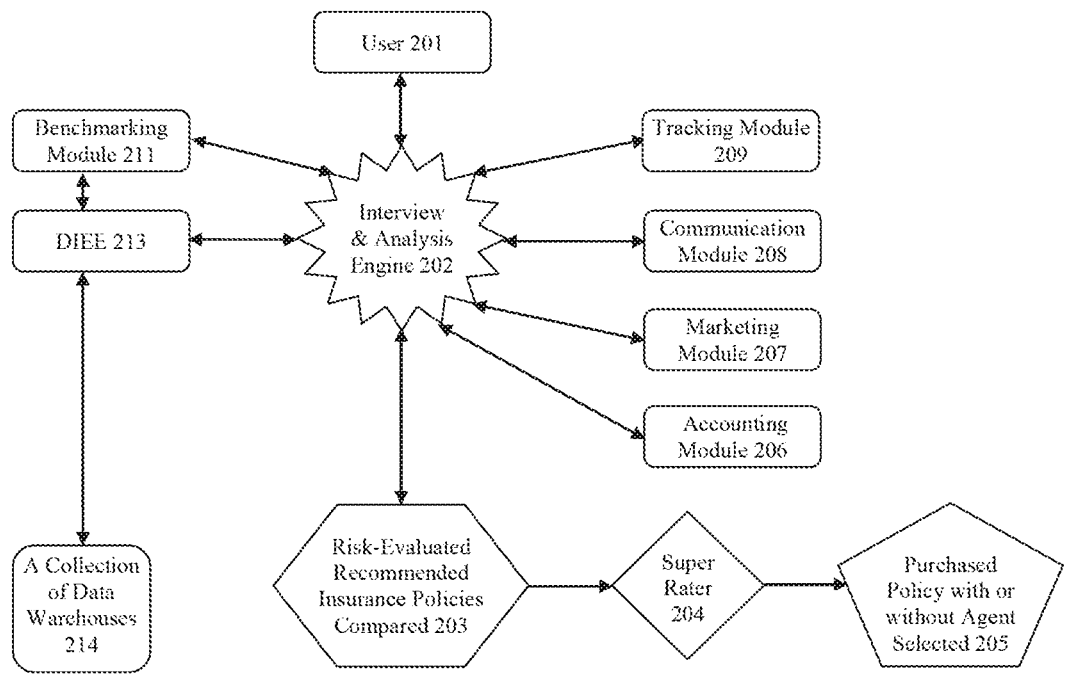
FIG. 2 depicts some components that may be used in various combinations for various embodiments of this disclosure.

Various relationships between some components of one of many possible embodiments of this disclosure are depicted in the example of FIG. 2. Generally, there are two types of users: consumers and professional users. In their search for insurance, consumers desire to purchase one or more policies that cover their risk exposures and fit their needs and budget. For this purpose, various embodiments of this disclosure may analyze data obtained about consumers from multiple sources. Some of these sources may be, for example: the consumer themselves, an individual other than the consumer (such as insurance professionals and the like), an import sources such as insurance companies and data warehouses, and information already stored, whatever the original source. Data may be obtained from the consumers themselves or users (for example, an insurance professional) through direct consumer or user input 201 and/or 202. In some embodiments, this direct user input is solicited through a process called an "interview." Also, data may be obtained by means of a data import-export engine (DIEE) 213. In this latter case, existing policy data or consumer information, for example, may be imported over a communication network from one or multiple sources such as insurance companies, insurance professionals' data systems, data warehouses, and the like. It is possible that certain desirable data may not exist or is unavailable for import. The interview process includes countermeasures for such circumstances by asking detailed questions, including questions related to any existing policies. In addition, previously obtained information such as policy data or health conditions may be accessed and the user is not asked to provide this information again. In some embodiments, a user may be given the opportunity to confirm previously obtained information. Once analysis is ready, the particular policies identified by the analysis may be compared and recommend to the user at 203, and selected coverages may be selected at 203 for rate comparison at 204. A policy may be purchased by the consumer or user at 205, with or without the assistance of an agent.

Figure 3:
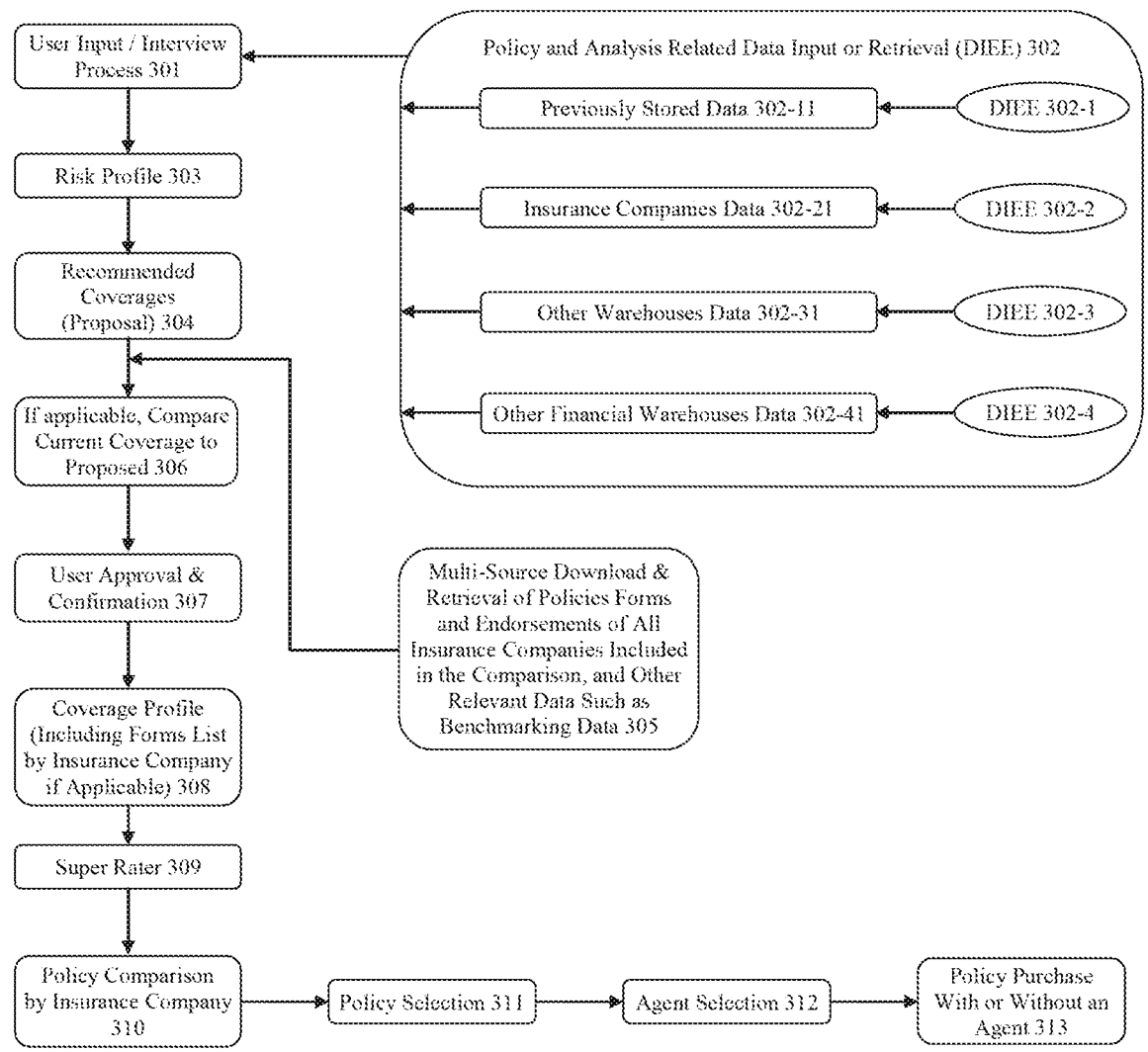
FIG. 3 illustrates, in some embodiments, a flow chart of a policy purchasing process.

The system and process depicted in FIG. 3 provides one example of various embodiments of this disclosure. In this example, the interview begins at 301 by asking questions about the consumer's personal information such as name, address, and date of birth. In the course of the interview, the user is asked about existing policies. Stored data 302-11 is imported via DIEE 302-1, so that these embodiments may use reliable information already stored elsewhere (for example, in cloud systems) rather than asking the users for information they either provided elsewhere previously or which is retained for the consumer elsewhere. Using DIEE 302-2, policy data 302-21 may also be retrieved from insurance companies. Using DIEE 302-3, policy data 302-31 may also be retrieved from other data sources such as data warehouses. In some instances, it may be convenient to obtain other financial data 302-41 such as from banks and financial institutions using DIEE 302-4. The interview process may continue by asking questions that address any missing information about existing policies or the insured, and/or questions needed for developing the analysis reports requested. For example, various embodiments of this disclosure may request information about home ownership, estimated replacement cost of a home, auto ownership, business ownership, net worth, or information related to consumer's lifestyle. In one embodiment, the answers to those questions are mapped to appropriate parts of the consumer's files and used to identify risk exposures and to create a comprehensive risk profile 303.

In the embodiments depicted by FIG. 3, a user may develop a personalized risk profile 303, obtain a comprehensive list of recommended coverages 304, and through a multi-source retrieval system 305 download existing policies and compare them to the recommended coverages 306. The user may select the desired coverages 307, where the interview and analysis engine 202 develops and presents the user with a personalized coverage profile 308. This coverage profile may include the desired coverages selected by the user and a list of policy forms by an insurance company. The user may then choose to rate the selected coverages using a Super Rater 309. The resulting summary report may include a comparison of policy coverages and premiums 310 from various insurance companies. The user then may choose to proceed with selecting the most suited policy or policies 311 and selecting an agent 312 based on certain criteria that will be described in more detail later and finally making a payment and purchasing the chosen policy or policies 313.

Embodiments of this disclosure may be deployed to enhance the insurance policy purchasing experience and provide various combinations of other benefits. For example, the process just described asks the user questions that are instrumental in assessing the consumer's risk exposures, in contrast with asking questions to help an insurance company or an insurance professional rate a policy. In addition, various embodiments may be devised to provide comprehensive policy options designed to cover the risk exposures that are identified through the interview process. Among other optional features, various embodiments of this disclosure may provide means for consumers to obtain their policy data from insurance companies or data warehouses, perform thorough analysis of policy language, and provide reports that identify gaps of coverage in the existing insurance program.

System Architecture

Systems, methods, components and steps are described below to facilitate visualizing various embodiments of this disclosure. Various embodiments of this disclosure may be implemented on one, or multiple system platforms or any combination of one or more systems and/or platforms. In some embodiments, a World Wide Web application resides on a remote computing device such as a server connected by wires or wirelessly to a network with access to the Internet. In this case, the user may access the system with a remote communication device, for example using another World Wide Web application residing on a computing device, a smart phone, a tablet or the like that is in the possession of a user. Other embodiments may be implemented directly and entirely on a computing device in the possession of a user, such as a desktop computer, a smart phone, or the like, thereby better protecting the privacy of the user. The computing devices may be based on Apple, Intel, Advanced Microdevices, or other microprocessors technology and utilizing memory devices manufactured by companies such as Samsung or Micron and/or various forms of storage such as a disk, flash memory, a solid-state drive, or other devices. The programming language may be accomplished in C++ or JAVA or any other suitable programming language that may achieve the desired results. Among others, many forms of hardware and software, system configurations, networking methods and configurations, programming languages, equipment manufacturers, and general applications may be used to implement various aspects and embodiments of this disclosure. Furthermore, various components of embodiments and/or various embodiments of this disclosure may be standalone applications or modules incorporated as a complementary component of other components, embodiments, applications, and/or modules.

Figure 4:
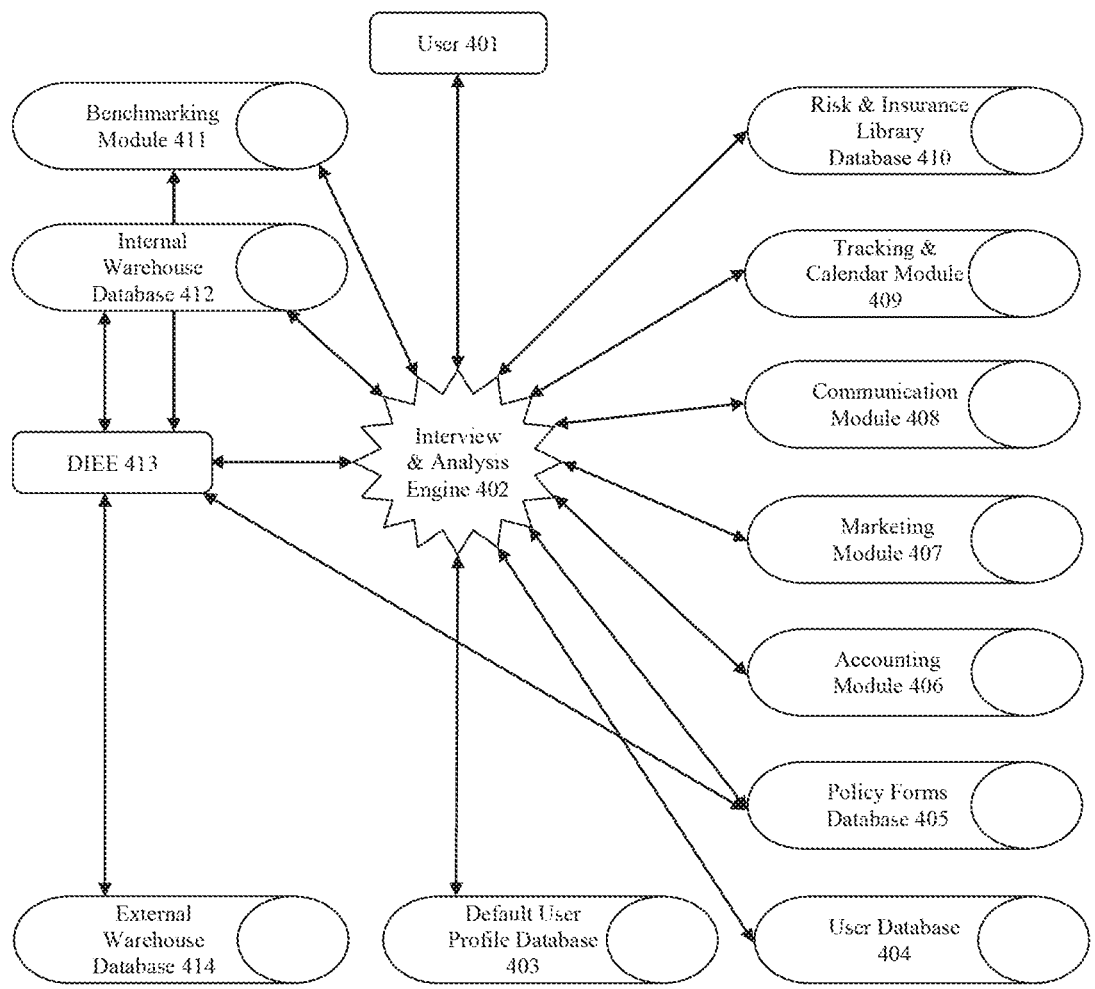
FIG. 4 depicts a more detailed view of some components that may be used in various combinations for various embodiments.

FIG. 4 illustrates various embodiments of this disclosure through a system block diagram corresponding, in some aspects, to the embodiments of FIG. 2. In these embodiments, the system may include various ones of an interview engine 402, default user profile database 403, user database 404, policy forms database 405, various databases 406-412, and data import-export engine (DIEE) 413. A user interface and/or an import source such as insurance companies' databases 414 are also shown in this illustration. Some aspects of the relationships between the various components of this system are described herein.

Cognitive Technique Interview and Analysis Engines

An interview engine and an analysis engine may be deployed to provide the consumer-centered risk analysis and insurance purchasing systems and methods of this disclosure. In some embodiments, an interview engine and an analysis engine may be provided together, for example as depicted in FIG. 4, while in some embodiments an interview engine and an analysis engine may be distinct aspects of the embodiments. In some embodiments an interview engine and an analysis engine may operate iteratively, while in some embodiments an interview engine and an analysis engine may operate serially.

The interview and analysis engines and processes of various embodiments may be configured to obtain important information from a user. In some embodiments, a conversation-style interview may be coupled with cognitive techniques to capture relevant information necessary to produce the desired outcome. Preferably, the interview is conducted from the consumer's (individual or entity) personal or business risk and financial perspectives, and not simply from the insurance companies' underwriting perspective.

For example, in some embodiments, a user may desire to purchase insurance policies. In such a scenario, the interview engine may present the user with a series of questions utilizing cognitive techniques to learn about the consumer and create their unique risk profile. Various embodiments then utilize this unique risk profile, knowledge of insurance coverages available to consumers, and knowledge of identified consumers' insurance needs to recommend coverages to users. In many embodiments, the policies recommend are more likely to provide better-tailored protection and better insure their risk exposures. Furthermore, in some embodiments, this risk profile may be used repeatedly to purchase and evaluate insurance policies, and it may be easily updated as needed, thereby reducing the probability of errors or omissions by consumers and professionals alike.

Regardless of the exact hardware or software, system configuration, programming language, manufacturer, design or application, among others, by which the system is implemented or accessed by users, in many embodiments the interview and analysis engine 402 provides some form of a user interface. The interview and analysis engine 402 itself may be comprised of one or more electronic component(s) or one or more software application(s) or any combination of these. Users may be offered a plurality of options and functionalities. In some embodiments the system may present a number of options available to users such as creating a risk profile report, a risk analysis report recommending coverages that insure the consumer against identified exposures, or a gap analysis report indicating gaps in coverage based on identified differences between the proposed recommendation and the existing insurance policies, among others.

Depending on the user's selections and desired outcome, various embodiments of this disclosure utilize a default user profile database 403 in the creation of a unique record (or profile) of the user, for example a record in a user database 404. A default user profile database 403 may contain a plurality of profiles offered to the user to improve the efficiency of the interview process. For examples, default user profile database 403 may contain a home owner default profile, a renter default profile, an attorney default profile, a contractor default profile, a corporate executive default profile, and so on. Each one of these profiles may share some common risk characteristics with other profiles and differ by other risk characteristics as well. In one embodiment, the interview begins with general questions such as name, marital status, date of birth, etc. and proceeds to selecting a default user profile and asking more specific questions using cognitive techniques. In some embodiments, all data about a user may be stored in uniquely identified set of records in the user database 404. Such data may include personal information, policy data and the like. Furthermore, the user database 404 may also contain a plurality of unique profiles and may be used by a plurality of users separately or at the same time. The user database 404 profiles may be retrieved on demand by a given user as identified by their log-in information or as identified by the selection of a particular profile the user may choose, as the case may be when the user is an insurance professional, for example. This capability and functionality may provide significant time-saving and accuracy advantage to returning users. In some embodiments, the returning user is presented with a number of options to update their profile in the user database 404. The update may be completed either by importing data utilizing the data import-export engine (DIEE) 413 or manually by selecting one or more of various options presented by the interview engine or other user interface.

In some embodiments, the interview and analysis engine may be combined at 402 and use a conversation-style interview and cognitive techniques logic to analyze the necessary information required for the desired outcome, which may or may not involve iterative operation of the interview engine and the analysis engine. For example, in some embodiments the interview and analysis engine 402 may have an algorithm and logic used to create a customized risk profile, propose coverage recommendations, or identify gaps in existing insurance programs. In these embodiments, when a user selects a default profile from the available profiles in the default user profile database 403, specific common risk characteristics are associated with this user. During the conversation-style and cognitive techniques used by the interview and analysis engine 402, a user profile is developed to specifically match those unique risk characteristics associated with the user and the developed risk profile is stored in the user database 404. This interview style and usage of basic common assumptions may be configured to improve the efficiency of the process while accurately inquiring about information needed to develop the risk profile. For example, if a user selects a student default profile, the process may start with certain assumptions common for typical students' risk exposures and the questions may be designed to inquire about typical students' risk exposures. In accordance with this example, various embodiments of this disclosure may simplify the interview process and not ask questions about the liability limits required to insure business exposures. However, even in such example, various embodiments may provide the user with an opportunity to update the consumer's risk profile at any time. Once a user indicates that a particular interview area does not apply to them, this selection is stored in the developed user's risk profile and the same selection is used subsequently, unless updated by the user. In some embodiments, the interview and analysis engine 402 offers users a summary of skipped topics with the option to update their risk profile.

In some embodiments, a data import-export engine 413 may be used to download data from various data warehouses. The data download may be automatic based on certain system requirements or as needed based on specific consumer's needs and risk profile characteristics. Depending on its nature, the downloaded data may be stored in databases such as a policy forms database 405 or a benchmarking module 411, to name a few examples. Generic policy forms and data may be stored in a policy forms database 405. Benchmarking data and information may be stored in a benchmarking module 411. Furthermore, some embodiments of this disclosure may contain other modules to assist professionals with their normal daily activity and efforts to reduce errors and omissions efforts, for example including but not limited to accounting, marketing, communication, policy and notes tracking modules 406-409. The internal warehouse database 412 may contain a list of institutions such as various insurance companies, financial institutions or government entities which host users' relevant information and from which a user may be given the option to download information. The databases included in various embodiments of this disclosure may be software or data tables residing on the same hardware, separate hardware and software networked with other components of embodiments, or other database module formats.

An accurate user risk profile created using the cognitive techniques detailed in various embodiments of this disclosure may provide various advantages. For example, once a risk profile is developed it may be used at any time in conjunction with other relevant data such as current policy and benchmarking data downloaded using the data import-export engine 413 and stored in the user database 404 and the benchmarking module 411 to create a coverage gap analysis and benchmarking reports, thereby alerting consumers to risk areas that are either not covered or inadequately covered by current policies. Furthermore, based on the data analysis of the cumulative data gathered about the consumer, such as the consumer's risk profile and the available coverages, various embodiments of this disclosure may provide a recommendation to mitigate those gaps in coverage.

FIG. 5 illustrates a user interface utilized by various embodiments of the interview and analysis engine. In these embodiments, the interview may start with a simple introduction that collects various information.

Various embodiments of this disclosure may be capable of analyzing a user's existing policy data and forms, when available. In some embodiments, the insurance policy forms are analyzed by various means and by any one or combination of those means. For example, policy forms may be analyzed by humans reading insurance policies and classifying information in ways usable by various embodiments of this disclosure, or by electronic search or keyword recognition through software where again this information may be organized and classified in files usable by various embodiments of this disclosure. Other structures and steps may be used to analyze insurance policies forms and consumer data.

FIG. 6 illustrates an embodiment of this disclosure where the interview and analysis engine 402, through a user interface, asks the user's permission to download existing policy data electronically from an external warehouse database 414. In one embodiment, the external warehouse database 414 that hosts the user's policy data may be the user's insurance company's database or any other entity hosting the user's policy data. Also, the user may be given a list of options from which to choose the type of data obtained from external warehouse database 414. These options may include and are not limited to policy limits, policy forms, policy endorsements, summary of benefits, outlines of coverage, declaration pages, etc.

FIG. 7 illustrates an embodiment in which the interview and analysis engine 402 provides the user with an opportunity to import policy data from an external warehouse database 414 by selecting the insurance company or institution and a policy number or any other policy identifying information such as social security number or a Federal Employer Identification Number (FEIN), etc. The policy information necessary varies depending on a number of factors, such as whether the insured is an individual or a business, the type of policy, and the external warehouse database 414 requirements. There are multiple ways by which the insurance company's or any other relevant institution's information may be selected. For example, this field may be completed by the user or selected from a list of institutions and companies stored in the internal warehouse database 412.

Not all insurance companies may participate in policy data download. However, there are many insurance companies that participate and some data warehouses that facilitate data downloads. Policy data download is a common practice between property and casualty insurance companies and insurance professionals, for example. It is also possible that the type of data made available for download by various insurance companies may vary from one company to another. Various embodiments of this disclosure may properly account for any missing information, alert the user, and provide the user with the opportunity to update any missing information.

In the insurance world, privacy and the protection of personal identifying information are generally protected. For this reason, various embodiments of this disclosure abide by applicable privacy laws. Various embodiments use appropriate authentication and legal consents for the download and transfer of confidential information. In addition to the fact that various embodiments of this disclosure may utilize various security measures and secure networks, various embodiments may also use the minimum number of personal identifying information during its user's data download. In some embodiments, as depicted in FIG. 7, a user is required to provide multiple personal identifying information, such as user's policy number (702), social security number (703) or Federal Employer Identifying Number, and the policy premium (704) or mailing address listed in the policy. Since the premium amount (704) at inception and effective date (705) will not generally be known to anyone other than the user and those authorized to retrieve the data, requiring this information as a security precaution provides a method of protecting access to the consumer's confidential or legally protected data. Other identifying data also may be used for authentication. For example, the consumer may already have a user ID and password directly with an external warehouse database 414. In this case, the authentication method may ask the user to provide that information in order to import data from the external warehouse database 414.

FIG. 8 illustrates, in some embodiments, a sample of consumer's policy information available through a business owners' policy data download from ABC Insurance Company, Inc.'s database 414. This information may be provided to the user through the user interface, and also may be classified and stored in pre-determined fields in data tables to be used in further analysis. In the illustrated sample, ABC Insurance Company, Inc. insures the consumer under a policy number ABC00001 with policy limits, deductible, and policy forms shown. As found in some embodiments, FIG. 9 illustrates a sample of individual medical policy parameters imported from an external warehouse database 414, and FIG. 10 illustrates a sample of auto insurance policy parameters imported from an external warehouse database 414. The references in this disclosure to an external warehouse database 414 should be understood to leave open the possibility that more than one distinct external warehouse databases are actually involved.

A consumer's data may be unavailable or incomplete. In some embodiments, the interview and analysis engine 402 may alert the user to any missing data and allow the user to edit missing information as illustrated in FIGS. 8-10. Various embodiments allow users to edit missing data on a number of user interface screens. In addition to the imported data views illustrated in FIGS. 5-10, in some embodiments a summary of missing or incomplete data or edited imported data is available for viewing at the user's discretion, which may provide another method to update any missing information.

FIG. 11 illustrates an example of a policy data summary presenting some of the user actions available in the depicted embodiments. For example, some of ABC Insurance Company's data was missing, but was previously edited by the user. In the case of BCD Insurance Company, no data was downloaded and in order to complete the objective selected by the user the user must provide the missing data. On the other hand, some of XYZ Insurance Company's data was missing, but completing this data is optional for the chosen objective. If the data is not entered it will not impact the result because the missing data has no bearing on the objective selected by the user. Furthermore, in some embodiments, there may be instances where relevant data cannot be downloaded and is not known to the user. In such cases, depending on the nature of the unknown data and the user's objective, various embodiments of this disclosure may allow the user to proceed in obtaining the desired outcome. In some embodiments, the missing data may either automatically be substituted with certain assumptions or entered by the user based on suggestions obtained through benchmarking or otherwise. In such cases, the interview and analysis engine 402 flags the desired outcome and alerts the user to the fact that the results are dependent on certain assumptions. In other embodiments, the user may not proceed without completing the missing data. In some embodiments, the user may be given the opportunity to review the consumer's downloaded data and in some cases may be required to confirm or certify that the information entered is true.

In some embodiments, the request for policy data import may be completed simultaneously or one policy at a time. For example, a user may have a home insurance policy, an auto insurance policy, an umbrella insurance policy, a life insurance policy, a health insurance policy, and a disability insurance policy that may be imported from multiple data files made available by user or external warehouse databases 414 to provide a complete picture of the user's risk and exposures. Similarly, for example, a business may have a business owner's policy, an umbrella insurance policy, and a key-man life insurance policy. In some embodiments, once the proper authentication and permissions are granted, the import process from an external warehouse database 414 may be seamless to the user.

In some embodiments, the data import-export engine 413 may automatically select the most reliable source of data for each item and provides the user with an opportunity to edit the selection, which may help to reduce data redundancy. For example, insurance policy data may be available directly from the insurance company or from a data warehouse, but the policy limits for certain coverages may be different from each source or redundant within one source. In this case, an endorsement after the policy inception date may have taken effect to alter limits. Therefore, in some embodiments the data import-export engine 413 automatically takes into consideration the limits indicated by the endorsement and the differing data may be flagged for the user's attention. If differences between data sources cannot be resolved, the user may be prompted to select the option they deem appropriate or to edit the data as they see fit. FIG. 12 provides some examples of the sources of the data for various information in accordance with some embodiments of this disclosure.

In some embodiments, after a data download has been completed by the data import-export engine 413, data may be reconciled with possible input from the user, and each parameter may be classified according to a particular convention. For example, general liability each occurrence limit or general aggregate limit, etc. Another example of data reconciliation and classification may involve the analysis of policy forms. In some embodiments, policy forms downloaded or uploaded by the data import-export engine 413 may be analyzed, and information in these forms may be classified, in accordance with certain standards and in preparation for further analysis. For example, the term Business Income may be used in various commercial insurance policies. However, different policies may define Business Income differently. Various embodiments may be configured to recognize these differences and classify the term differently as it is used in further analysis. In some embodiments, the user will be given the choice to examine the imported data, confirm the import source, and edit it on various user interface screens.

Figure 13:
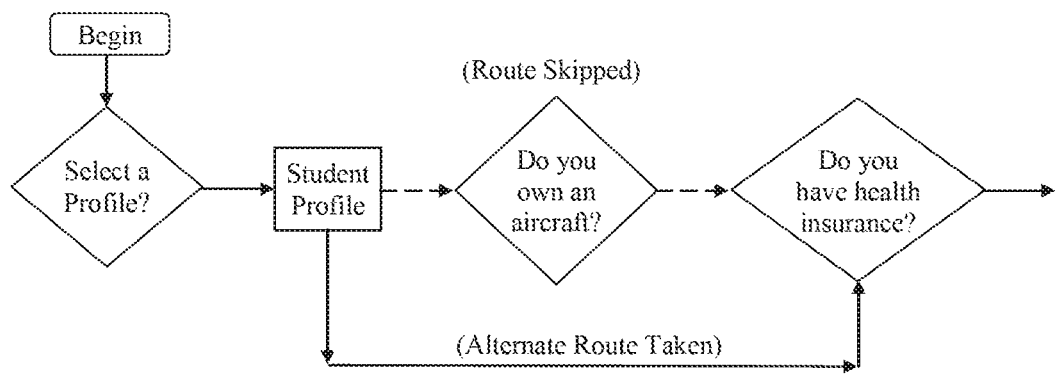
FIG. 13 depicts an example illustrating the value of a cognitive technique process used during the interview.

The conversation-style interview process in some embodiments may use cognitive techniques in its inquiry about relevant consumer data for the purpose of achieving the desired outcome, as selected by the user. This cognitive technique significantly improves the efficiency and accuracy of the process by using a human-like logic in the programming algorithm which controls the conversation-style interview. An example of this technique is shown in FIG. 13. FIG. 13 illustrates an example of an individual who selected the default profile of a student with an income of $24,000 annually, residing in an apartment, and not owning a vehicle. In this case, the interview and analysis engine 402 will not find a reason to inquire about the consumer's need for aircraft liability insurance. Therefore, the interview and analysis engine 402 automatically skips the questions related to aircraft liability insurance under the likely assumption that the user does not own an aircraft, and proceeds to inquire about the consumer's need for health insurance, for example. In some embodiments, the user will have the aircraft liability section highlighted as an "assumed" risk should the user desire to update this information at a later time. A person of skill in the art will understand that many issues and factors may be subject to cognitive techniques to enhance the efficiency of the interview and the results of analysis.

Figure 14:
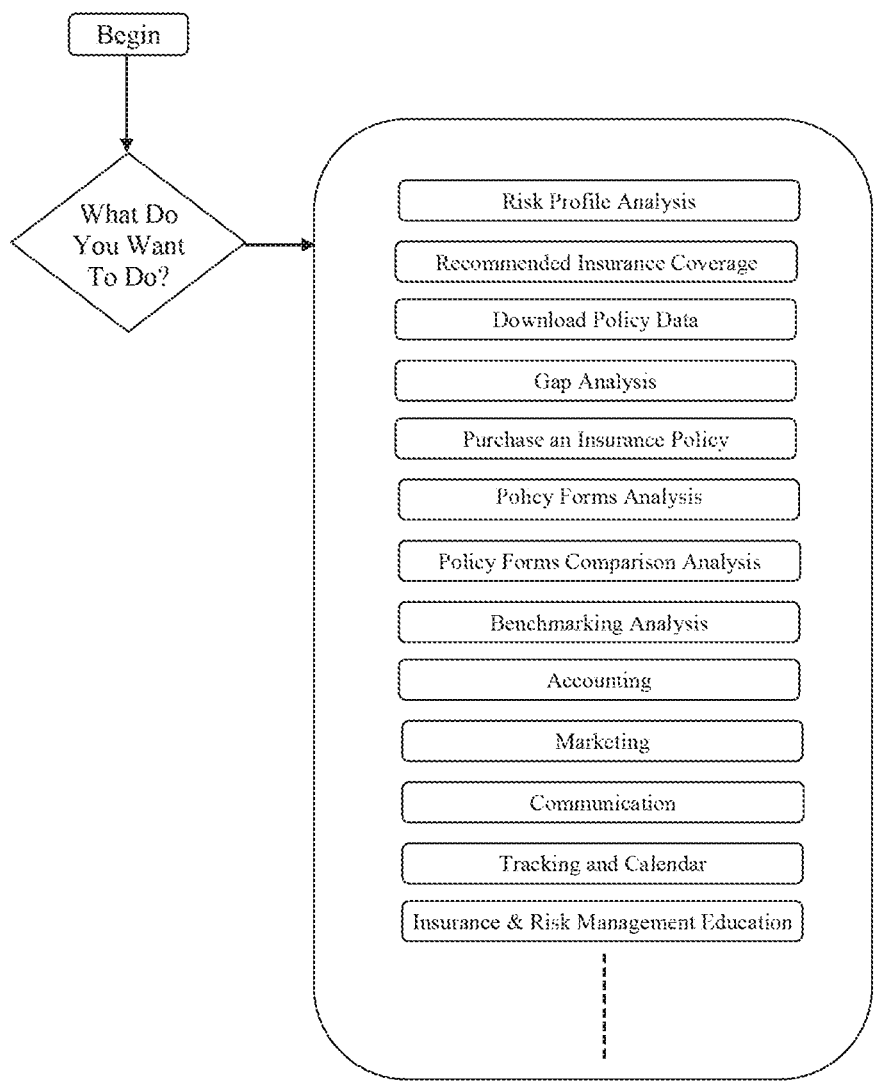
FIG. 14 illustrates various components that may be deployed in various combinations for various embodiments.

FIG. 14 illustrates, in some embodiments, a menu of options available to users and presented to users through a user interface. The order of the menu options may be varied.

Various embodiments of this disclosure may be provided in a variety of versions. For example, some versions may be accessible for a fee and others may be accessible with a limited functionality at no cost to users. In some embodiments, the user interface screens may differ and may be determined by whether the user accessed the free version or the pay-per-service version, or by various selections made by the user. The following discussion describes some additional aspects of various embodiments of this disclosure.

Recommended Coverage Report

Figure 15:
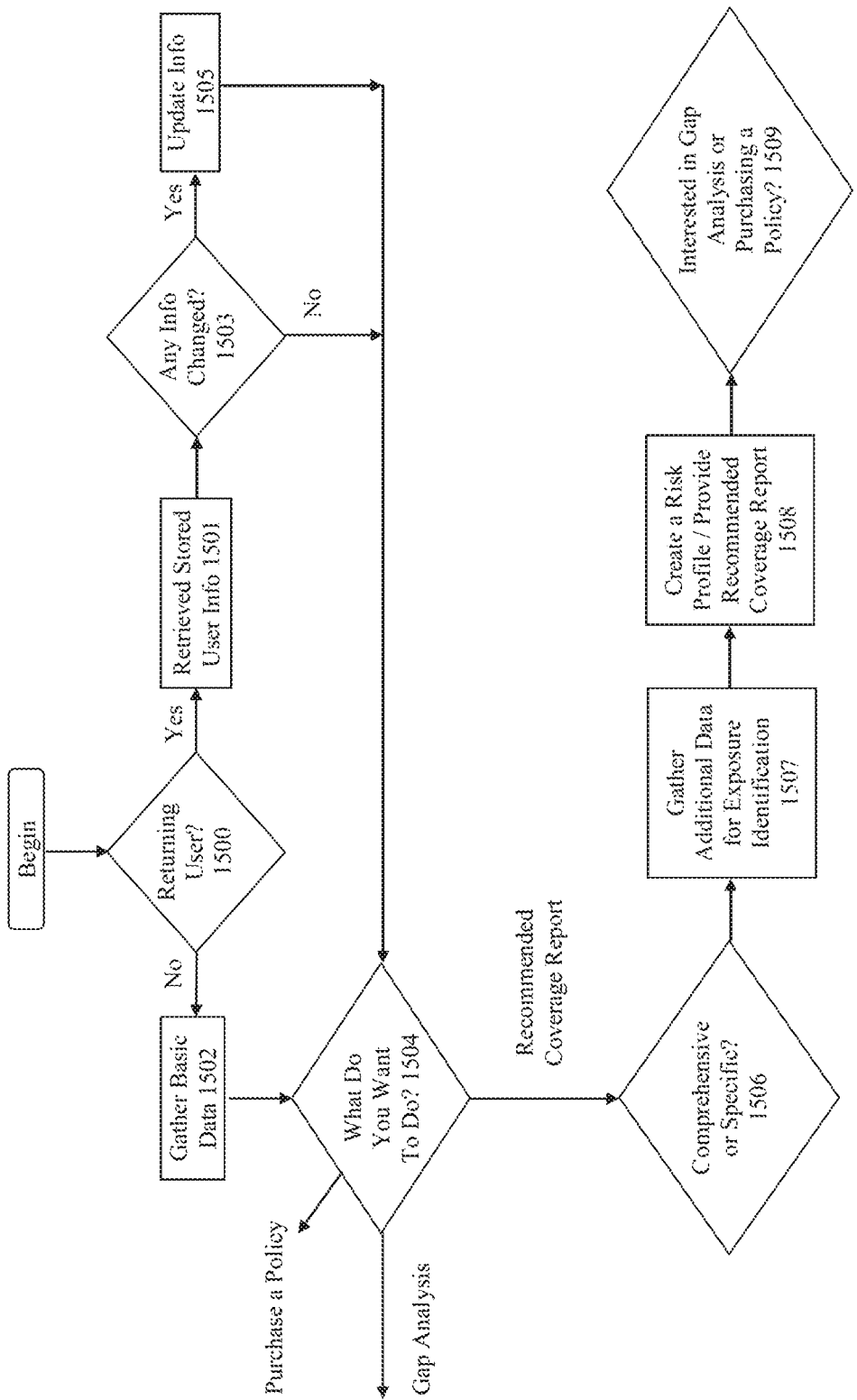
FIG. 15 illustrates a flow chart of the recommended coverage report process used in some embodiments.

FIG. 15 illustrates a flow chart of a process by which various embodiments of this disclosure may create a recommended coverage report. At the time a user accesses the system, the user may be asked basic unique personal information to identify the user. In some embodiments, the user may be asked to register by creating a username and a password or may be asked to access the system as a guest without permanently saving any information about the user in any databases. A user may be a new user or a returning user. At 1500, various embodiments of this disclosure verify whether a user is a new user or a returning user. For example, in some embodiments if a record for the user is found in user database 404, the user may be classified as a returning user. Otherwise, the user is a new user. The unique set of personal information may include authentication information such as a username and a password or other personal information such as a name, a date of birth, or address, among others. If it is determined in step 1500 that the user is a new user, the interview and analysis engine 402 may start the interview by asking basic personal information questions 1502 including the user's default risk profile preference. After the identification and the gathering of basic personal information, the interview and analysis engine 402 may provide the user with a plurality of options 1504 from which to choose. In some embodiments, the desired outcome may be any combination of one or more of any options offered to the user. For example, the user may select to perform a recommended coverage report with a gap analysis report and purchase a policy at the same time. In some embodiments, at any point in time the user may be provided with the option to change their objective. In some embodiments, when selecting a recommended coverage report the user may also be offered the option of a specific recommended coverage report or a comprehensive recommended coverage report. A comprehensive report is one that would include one or more type of insurance policies and is designed to analyze and cover all of the consumer's exposures. Examples of the type of insurance analysis that may be included are home, auto, health, business owners', professional liability, property, umbrella, etc. A specific recommended coverage report is one that would be selected by the user from a list of options. This may also include one or more insurance policies, but may not necessarily analyze all of the consumer's exposures. For example, a user may choose a health insurance recommended coverage report.

In some embodiments, the level of detail in a recommended coverage report may be controlled by the user in a drill-down manner. In a drill-down approach, the generated report may be a top level summary of general exposures and recommendations or it may be detailed to the level of policy-specific coverages, limits, and exclusions report. A higher level report may provide direct links to more detailed information. In some embodiments, the user may be able to use a link to view the specific coverages recommended.

In some embodiments, the interview and analysis engine 402 may by asking a number of questions at 1507 to identify the consumer's risk exposures. The questions asked may vary based on the user's desired report. For example, in the case where the consumer is interested in a specific recommended coverage report of homeowner's policy risk analysis, the interview and analysis engine 402 may ask whether the consumer owns any jewelry, firearms, silverware, computer software, or any business personal property at home and about the replacement cost of these items. After a plurality of questions, the interview and analysis engine 402 may develop the consumer's risk profile and generate a recommended coverage report at 1508, which may advise the consumer on a series of recommended coverages for purchase that address the consumer's risk exposures based on the information provided by the user. After that, the interview and analysis engine 402 may provide the user with additional options at 1509. In some embodiments, for example, following the recommended coverage report the user may be provided with the options to perform a gap analysis or purchase a policy.

Because the questions asked during the interview process at step 1507 are critical for the proper identification of risk exposures it would be appreciated to provide an additional example. For this purpose, the interview and analysis engine 402 may ask a business owner in search for a business owner policy if portable equipment is used off site by employees in the business or if employees attend exhibits or if the additional insured requirement is in writing. If these practices are exercised, the inclusion of property floater coverage may be recommended so that portable equipment is covered off site and recommend adding the appropriate endorsement, if necessary, to ensure liability coverage is stipulated at exhibits. In the case where the additional insured requirement is not in writing, the type of additional insured endorsement where a written contract is not required in order for coverage to be afforded to the additional insured under the user's insurance policy may be recommended.

In another example, a user may be an individual interested in a comprehensive recommended coverage. For example, a consumer may desire to know his or her overall risk exposure in a number of areas such as home insurance, life insurance, health insurance, disability insurance, etc. In such case, the interview and analysis engine 402 provides the user with the option to obtain such a risk profile and the questions asked will be determined based on the desired analysis. To illustrate, an individual may desire a comprehensive recommended coverage that includes home insurance, life insurance and disability insurance. In such case, the interview and analysis engine 402 may ask similar questions as outlined earlier for home insurance exposure identification, and for life and disability insurance exposure identification it may ask about the annual income, if the user is a homeowner, the loan amount owed on the home, the number of dependents, and the user's profession. These types of questions assist in estimating the life insurance death benefit amount or the disability benefit amount needed to sustain the user's family for a specific period of time.

In yet another example, the consumer may be a business seeking a comprehensive risk analysis. In this case, depending on the type of business and a plurality of other factors such as revenue size, number of employees, location, local or global market presence, the interview and analysis engine 402 in some embodiments may customize the interview questions to create the desired risk analysis profile. For example, the interview and analysis engine 402 may ask a business owner if the business receives income from consulting services or if the business administers its own employee benefits programs. If such practices are present, in addition to the typical general liability exposures, a professional liability policy and an employee benefits liability policy with the appropriate bond as required by law may be recommended.

Various embodiments of this disclosure may make the process of updating a risk profile easier, more efficient, and more traceable. A returning user may desire to update their risk profile and obtain a new recommended coverage analysis report due to a life change. In some embodiments, the life change situation may be time stamped and a chronological history of the risk profile change may be obtained or plotted upon request, and a new recommended coverage report may be presented. For example, a user bought a new home and desires to understand if any change to his home insurance coverages is needed. In this case, various embodiments of this disclosure may recommend increasing the dwelling limit after calculating the replacement cost value of the new home. In some embodiments, the new change may be documented chronologically and may be plotted. Business applications particularly may be benefitted. For example, if a large business leases a new store, it may be advantageous to have a chronological record of such events and all of the insurance consequences associated with ensuring the user complies with all legal and contractual requirements. This also ensures that those requirements are transferred correctly from one policy to another policy at renewal over the years. This may be much appreciated by insurance professionals when performing quality control checks on renewal policies or after modifying a policy.

Coverage Gap Analysis

Figure 16:
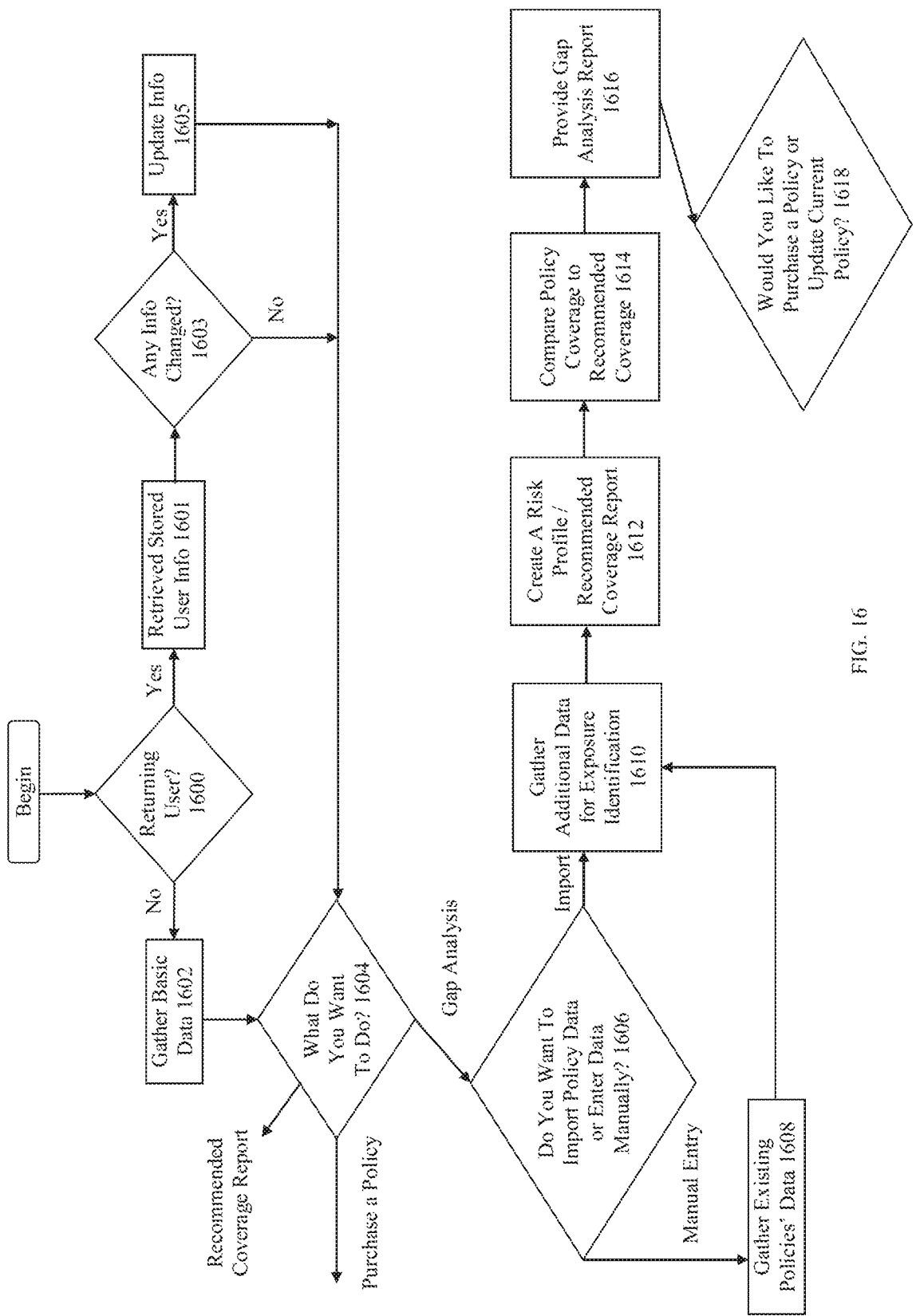
FIG. 16 illustrates a flow chart of the coverage gap analysis report process used in some embodiments.

FIG. 16 illustrates a flow chart of the process by which various embodiments of this disclosure may create a gap analysis report. As in FIG. 15, a user may be identified at 1600 as either a new user or a returning user and the process progresses as before except that a user may choose at 1604 to create a report outlining gaps in coverage in the consumer's existing insurance policies where insurance coverage is either lacking or insufficient. This report is referred to as a gap analysis report. Similar to the recommended coverage reports, there may be various versions of coverage gap analysis reports differing by the needs of the user, the level of details provided, and the educational supplementary information provided.

In some embodiments, at any point in time the user may change their objective. For example, the user may select the type or number of analyses desired, when using various embodiments of this disclosure. When a user selects the gap analysis report option the interview and analysis engine 402 presents the user with the options of importing policy data from an external warehouse database 414 or entering policy data manually at 1608. If the user chooses to import the policies' data, the data import-export engine (DIEE) 413 uses the user's selection of import source (e.g., an external warehouse database 414 such as insurance company, data warehouse, etc.) to import policy parameters into various embodiments of this disclosure for further analysis. If the user chooses to enter policy data manually, the interview and analysis engine 402 may ask a plurality of specific policy related questions to determine current coverages and limits and may continue to ask additional questions to identify risk exposures 1610 and create a risk profile at 1612. Once the risk profile information and policies' data are obtained, various embodiments of this disclosure may run through a comparison analysis of the current and recommended coverages and limits at 1614. Then the user may be presented with an analysis report showing the differences in the coverages and limits at 1616.

In addition, various embodiments of this disclosure may suggest additional resources or provide educational information for the user to gain further knowledge of insurance terms, coverages, and issues. This may be accomplished by means such as hyper-linking words shown in the user interface screens to webpages or documents located on other websites or linking to documents stored in a database such as the risk and insurance library database 410. Furthermore, the user may be provided a plurality of options to enhance its current coverage at 1618. For example, the user may be given the opportunity to enhance the consumer's current policy's coverages, or purchase a new substitute policy, or purchase an additional complementary policy at 1618. Should the user choose to purchase a new policy, the process, in some embodiments, might then follow the example shown in FIG. 17. However, should the user choose to update their current policy coverages, the user may be prompted to select the desired coverages from the gap analysis report and a Super Rater or other means may rate the cost of adding these coverages to an existing policy if possible, which in some embodiments may proceed to payment information and issuance of a new policy unless further underwriting is required. In such case, the policy update is referred to the insurance company or to an authorized party, such as an insurance professional or an agent of the insurance company, who is able to assist the consumer with policy issuance. In some instances, the recommended coverages may not be added to an existing policy, but rather be handled as the purchase of a new policy, for example as described in FIG. 17.

When a user chooses to import policy data from an external warehouse database 414, for example, the set of imported data may include specific policy forms and revision dates. If this information was previously analyzed, various embodiments of this disclosure may utilize information stored in its policy forms database 405 to recognize certain coverages and limits and use that information in a coverage gap analysis. For example, a consumer's home is insured by ABC Insurance Company with a policy form ABC123 revision date of January 2000. Various embodiments of this disclosure may recognize that ABC123 revision date of January 2000 policy form provides coverage to insureds on an "Open Perils" basis for the dwelling and a "Named Perils" basis for Personal Property. This form also, unendorsed, provides the insured with a $2500 coverage limit for jewelry and $1000 of coverage limit for firearms. Therefore, if during the interview the insured declares that he or she owns a ring that is valued at $10000, various embodiments of this disclosure may alert the user in its coverage gap analysis report to a gap in jewelry coverage in the amount of $7500. In various embodiments of this disclosure, policy forms database 405 may be regularly updated from one or more external warehouse databases 414, such as directly from insurance companies or departments of insurance, etc. If data import is not possible from an external warehouse database 414, various embodiments of this disclosure will provide the user with the option of manual policy data entry or policy file upload.

In situations where a consumer has multiple policies in-force at the same time, if such data is available, various embodiments of this disclosure may automatically propose a summation of all limits applicable for a specific type of coverage and may alert the user in case of a conflict or unnecessary overlap between insurance policies. For example, an insured may have one 20 year Term Life insurance policy with face value of $300,000 and another 10 year Term Life insurance policy with face value of $100,000. In such case, various embodiments of this disclosure may automatically calculate a total death benefit of $400,000 from year xxxx to year xxyy and a total death benefit of $300,000 for the remainder years until the end of the first Term Life insurance policy. This information would be shown in the coverage gap analysis report. In addition, during the interview process various embodiments of this disclosure may evaluate the appropriate Term Life policy limits of the insured, or as in the case of a home owner's policy, the home's Replacement Cost. Yet another example may be where a business has multiple Umbrella insurance policies in-force at the same time. In such case, and if applicable, various embodiments of this disclosure may automatically calculate the total limit of liability to be the combined limit of liability for all umbrella policies and present it in its various gap analysis reports.

Policy Purchasing

Figure 17:
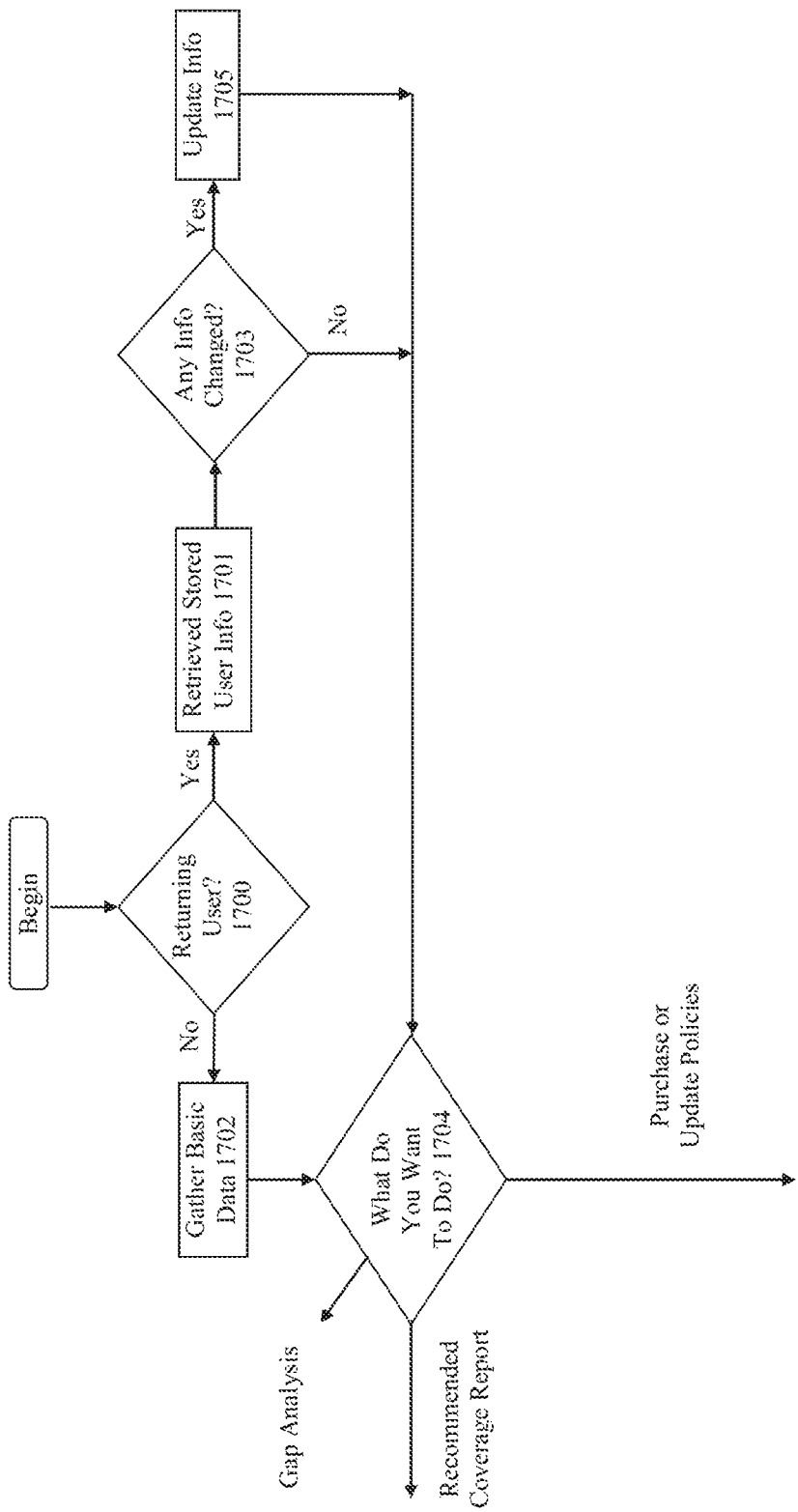
FIGS. 17 and 17.1 illustrate a flow chart of a policy purchasing process used in some embodiments.

FIGS. 17 and 17.1, illustrate, in some embodiments, a flow chart for purchasing insurance policies. The process of purchasing an insurance policy begins in FIG. 17 similarly to those processes described in FIG. 15 and FIG. 16. A user is first identified at 1700 as either a new user or a returning user and the process progresses as before except that a user now may choose to purchase a brand new policy or multiple policies or update a current policy or policies at 1704. In such cases, the user is provided the opportunity to import or manually enter existing policies at 1706. Based on the user's selection at 1708 the user may import policies or proceed by entering the data manually at 1710. If the user is not insured, the interview and analysis engine 402 begins the interview process to identify exposures at 1712 and create a risk profile and a recommended coverage at 1713. If the consumer is already insured, a gap analysis report may be created at 1713. The user then may confirm the desired coverages and may be provided the opportunity to add, edit, or remove selected coverages at 1714. When the list of desired coverages is finalized, a Super Rater may use this list to rate the selected coverages with multiple participating insurance companies and a coverage comparison report may generate and proposed to the user at 1715. In various embodiments of this disclosure, in addition to the premium, the coverage comparison report may include a side-by-side comparison list of the recommended coverages as identified and a list of each insurance company's offered coverages, and may alert the user when coverage is less than ideal. Furthermore, in situations where coverages do not identically match between companies a brief summary of important coverage differences between the policies presented may be displayed or indicated on the report and a link to the actual policy forms, or any other relevant educational references, may be made available for the users' review. In some embodiments, the user or consumer may proceed to purchase the desired insurance policy at 1716.

Various embodiments benefit from the use of a user risk profile and from keeping it up-to-date. Very often, insurance professionals seek multiple proposals from multiple companies at policy renewal time. An up-to-date consumer risk profile that contains all of the consumer's insurance needs and contractual requirements, such as required additional insured stated in a lease for example, may better protect consumers and help insurance professionals avoid errors and omissions. With various embodiments of this disclosure, users will not have to rely on documents or on the most current policy information which may have not adhered to the original insurance needs or requirements or deviated in policy language over the years from the language stated in the user's contracts.

FIG. 18 illustrates, in some embodiments, examples of some of the elements that may be presented in a summary report for a home insurance policy when a user chooses to evaluate options to purchase a policy at 1715. For example, in the case of a home insurance policy purchase, the recommended jewelry coverage limit was identified during the interview process to be $2,500 based on user's input. However, the unendorsed home owner's policy form ABC123 revision January 2000 from ABC Insurance Company may cover jewelry up to a $2,500 limit on an Agreed Value basis while the unendorsed form XYZ123 revision May 2005 from XYZ Insurance Company may cover jewelry up to $2,500, but on an Actual Cash Value basis. In this case, the difference in coverages between the forms is provided in addition to the difference in premium. This information may be useful to users. Agreed Value coverage generally would be better than Actual Cash Value coverage. Even though the user may not understand the importance of the difference between coverages, various embodiments of this disclosure may make the recommendation to the user. Also, an explanation or the definitions of insurance terms such as Actual Cash Value and Agreed Value may be provided with a listing of other additional educational resources. Such educational resources may include the financial rating of insurance companies, number of complaints submitted to the department of insurance, on-line customer reviews and experience, etc. Various ways to deliver educational information to the user could be used, for example using a web-based form, a form stored in a desktop configuration, or other delivery options. In a similar fashion, the applicable policy forms may be made available for the user's own review and analysis.

The conversation-style and cognitive techniques used during the interview in some embodiments may advantageously incorporate a consumer's preferences in the decision making process. Various embodiments of this disclosure may recommend and rank specific coverages, insurance policies and insurance companies based on what is important to the consumer and after learning about the consumer's priorities. For example, some embodiments of this disclosure may assign each coverage a default priority number ranging from high to low, or 1 to 3 respectively. The user may choose to edit the priority of a certain coverage at any time. Many consumers do not have a thorough understanding of the impact of lack of coverage on their well-being. This priority ranking may help the user gain a basic understanding at a glance. In addition, the coverage default priority may assist the user in making wiser decisions as they attempt to reduce the policy premium by eliminating coverage. In this way, eliminating a coverage with a low priority (number 3) has less severe consequences compared to eliminating a coverage with a high priority (number 1). In addition, the user may be provided options to determine the method by which the insurance policies are recommended (or ranked). During the interview process, the interview and analysis engine 402 may ask the user to decide on the factors important to the user and their level of importance (low, medium, and high or 3, 2, and 1 respectively) when making a decision about the insurance policy and insurance company. For example, some of these factors may be broader coverage, lower premium, the rating provided by reputable rating agencies such as A.M. Best, customer satisfaction ranking or available customers' reviews, insurance companies with high social conscience rankings, or the number of complaints to the department of insurance, etc. The user chooses which of these factors are important to them and the level of importance. Based on the user's preferences, various embodiments of this disclosure may take into account all user preferences and makes a recommendation that best satisfies the user's criteria.

Yet another example of the process by which various embodiments of this disclosure may use consumers' preference is when a user chooses higher importance for premium over coverage. In this case, reducing the personal property limits may be recommended if certain criteria are met or, in some instances, it may be in the best interest of the consumer that a combination of policies from multiple insurance companies be purchased instead of purchasing all policies from the same company.

Policy Forms Analysis

Analyzing insurance policies is a complex task even for highly trained and experienced professionals. Various embodiments of this disclosure may dissect each policy form into coverage segments and summarize the forms in a language that most readers can comprehend. The analysis may be completed by humans or electronic forms or a combination of any method available to segment and summarize the forms. In one embodiment, the summaries of coverages are tabulated and indexed by topic (policy signature files) and are stored in the policy forms database 405. The summary is then recalled when a user asks a question about a particular form. In some embodiments, this process may be performed by the interview and analysis engine 402 utilizing a conversation-style interview process and the cognitive techniques described earlier. Examples of topics that may be indexed and tabulated in the policy signature files are insuring agreements, the type of policy form used such as Occurrence or Claims Made, policy terms definitions, exclusions, major coverages such as network security, patent infringement, selection of defense council, whether the forms afford coverage for independent contractors working on behalf of the insured or not, off premises property coverage, etc.

For example, a user owns a technology company and is interested in learning about the professional liability coverages embodied in form ABC001 version January 2000. In some embodiments, the user accesses the system and chooses a Policy Forms Analysis function at a step similar to 1504 or 1604 or 1704 following a similar process to those presented by FIGS. 15-17. FIG. 19 illustrates, in some embodiments, a user interface presented to the user by the interview and analysis engine 402. In this embodiment, a user, through the interview and analysis engine 402, accesses the list of insurance companies stored in the internal warehouse database 412 or in the policy forms database 405. For example, the user may be able to select the name of the insurance company from a pull-down menu or by entering the name of the insurance company in the associated field. Similarly, the user enters information such as the form number of interest, its version date, and its title. Similarly, this information is stored in the policy forms database 405. The user also may enter a question of interest. The specific information and/or input options may vary widely but still be applicable.

For example, the user may enter a question such as "What coverage is included in this policy form?" by typing or by speaking and various embodiments of this disclosure will process the information provided. In this case, the interview and analysis engine 402 lists a brief summary of the insuring agreements which the form includes. An example of this summary is shown in FIG. 20. Defined terms shown in the summary may be highlighted in some way, and may be linked and/or displayed in the original policy language when, for example, a user hovers the computer's mouse over the term or otherwise indicates interest in such terms.

Another example may be when a home owner is attempting to confirm if there is any coverage for his property in an off-site storage facility. The user may state his question as "Do I have coverage at a storage facility?" Various embodiments of this disclosure will respond appropriately based on the policy form used.

Furthermore, various embodiments of this disclosure are capable of combining information from multiple forms. In the embodiments depicted in FIG. 19, for example, a user may click on the Add button to insert additional form fields and enter the information for the added forms for a comprehensive analysis, or the user may upload multiple policy forms. For example, a form ABC001 February 2001 may not afford coverage to independent contractors acting on behalf of the insured. However, form ABC002 February 2001 provides that coverages. Therefore, both forms analyzed together afford coverage to the insured and its independent contractors. In addition, a user may choose to upload an entire policy file for analysis.

Analysis using various embodiments of this disclosure should not be considered a substitute for a full reading of an entire policy, but various embodiments of this disclosure may provide users, insurance professionals and/or risk managers a great ability to analyze and dissect policy coverages quickly, easily and effectively. Also, various embodiments of this disclosure may attempt to use everyday language to explain complicated legal concepts while being committed to the accuracy of the original policy language as much as possible.

In various embodiments of this disclosure, a user may choose to gain better understanding of his or her existing policy. In this case, the user may download his or her policy data using the data import-export engine 413 and select the Policy Analysis function in the user interface. Through the interview and analysis engine 402 the user may ask any questions they may have about the policy.

There may be situations where some policy forms may have not been analyzed by various embodiments of this disclosure and summary forms do not exist in the policy forms database 405. In such cases, various embodiments of this disclosure will alert the user to this fact and may offer alternatives such as calling or emailing the insurance professional who sold the policy or the insurance company. Also, in cases where free-form policy forms are used, various embodiments of this disclosure will alert the user, permit the user to enter data manually, or may require the user to call or email an insurance professional.

Policy Forms Comparison Analysis

It generally will be useful for consumers and professionals to understand the difference in coverage between policies or, as part of a quality control procedure, to compare a renewal policy to an expiring policy. Using the same concepts described in the Policy Forms Analysis section, in some embodiments a user may perform a thorough comparison analysis of two or more forms of the same type of policy offered by the same insurance company or different insurance companies. For example, a user may select to compare two home insurance policies or three business owner's property insurance policies or four professional liability policies or two life insurance policies or two disability insurance policies, etc. Various embodiments of this disclosure may not allow an attempt to compare two or more policies that are not of the same type and may alert the user to this invalid comparison attempt.

In some embodiments, a user who desires to purchase insurance policies may start with this objective in mind. In various embodiments of this disclosure, when the options the consumer desires are identified, a top level comparison of the forms may be performed in order for the user to select the policy they view as the most suitable for their needs. FIG. 18 illustrates this comparison in one embodiment. A drill-down option may be available as well.

A user may access various embodiments of this disclosure with the sole objective of performing a policy form comparison. This may be done in a similar fashion as described in the Policy Form analysis.

A casual consumer may be interested in a top level comparison whereas an insurance professional may be interested in detailed policy language comparison. For this reason, various embodiments of this disclosure may offer users multiple levels of comparison, nested levels of comparison, iterative levels of comparison, and/or other forms of comparison.

FIG. 21 illustrates, in some embodiments, a user interface provided a user selects a comprehensive policy forms comparison analysis option. If more forms are desired to be added to the comparison, the user has the option to add more fields for policy form entry by clicking a button or selecting the Add fields option. Also, the user has the option of uploading multiple policy forms for comparison. The outcome, in one embodiment, may be similar to that shown in FIG. 18 without the Recommended Coverage and Priority columns. In a specific policy form comparison analysis option, some embodiments may provide a field for the user to submit a question, similar to that depicted in FIG. 19.

Benchmarking Analysis

Very often insurance professionals desire a higher level of confidence in the recommended level of protection (coverages and limits) being offered to a consumer, particularly businesses. One way to do this is by comparing the level of protection recommended to a consumer with that obtained by peers of similar type and characteristics. In some embodiments, a user may select a benchmarking function from a menu of options, for example as shown in FIG. 14. The interview and analysis engine 402 may present the user with the option of importing an existing consumer's policy or entering the policy's data manually. Depending on the availability of the imported policy data, the interview and analysis engine 402 may be able to recognize the characteristics of the consumer. Such characteristics may include, but are not limited to industry, annual revenue, annual payroll, number of employees, geographical and number of insured locations, existing employee benefits plans, number of owned automobiles, etc. If the policy does not contain all of the necessary information, various embodiments of this disclosure may notify the user and offer the option of manual data entry. The interview and analysis engine 402 requests the data import-export engine 413 download benchmarking data based on the characteristics obtained from the consumer's policy, user, or other sources. The data import-export engine 413 downloads benchmarking data from an external warehouse database 414. The interview and analysis engine 402 compares the data obtained from the external warehouse database 414 with that of the recommended coverage or the existing policy data and presents the user with a report containing information on the comparison, for example such as a graphical or tabular representation or text, illustrating where the consumer stands with respect to certain coverages. For example, the report may contain statistical data or charts that inform the user that 90% of the consumer's peers purchased General Liability Aggregate limit of $1,000,000 or higher. If the consumer purchased a General Liability Aggregate limit of $500,000 he or she now knows that a consideration of higher Aggregate limit may be necessary. If a decision is made to do so, various embodiments of this disclosure enable the user to proceed with increasing the policy limits or purchasing a new policy as described earlier.

Accounting

Various embodiments of this disclosure have the capability to incorporate an accounting module that would make it easy for insurance professionals to keep track of their clients accounting transactions. Some embodiments may provide a database 406 for handling such information.

Marketing

Various embodiments of this disclosure have an editing capability where an insurance professional may prepare marketing material and either email, export, or print them for mailing to clients directly. Some embodiments may provide a module 407 for handling such information.

Communication

Various embodiments of this disclosure have email and fax capability where an insurance professional may send emails of text, graphics or the like to consumers directly. Some embodiments may provide a database 408 for handling such information.

Tracking and Calendar

Errors and omissions are a major concern for insurance professionals. From this perspective, various embodiments of this disclosure have an editing mechanism that time stamps data entered by the user in chronological order. This tool assists professionals in maintaining a record of events pertaining to a specific client. The calendar tool assists professionals with client appointment scheduling and other tasks. For example, in some embodiments, a use of this module may be to send reminders to policy holders two months prior to policy expirations requesting information about policy changes so that the insurance professional may address any necessary updates to the renewal policy in a timely fashion. Some embodiments may provide a database 409 for handling such information.

Insurance and Risk Management Education

Some embodiments have a risk and insurance library database 410 as a source of publications and information that may be helpful to users, either during the interview process to educate users or for subsequent provision to users. For example, in some embodiments, when a user accesses the interview and analysis engine 402 and the computer's mouse hovers over a term such as Additional Insured, a new window may appear providing examples and guidance on who an Additional Insured might be. This type of information may be stored in the risk and insurance library database 410 and additional documentation on the topic may be available in this database to address the user's educational inquiries.

After appreciating this disclosure, those of skill in the art will recognize that the steps of the various methods, processes, and other techniques disclosed herein need not be performed in any particular order, unless otherwise expressly stated or logically necessary to satisfy expressly stated conditions. In addition, after appreciating this disclosure those skilled in the art will recognize that the claims may be embodied in a variety of different forms and that various changes, substitutions, and alterations can be made without departing from the spirit and scope of the disclosure. The described embodiments are illustrative only and are not restrictive, and the scope of the inventions described herein is defined solely by the following claims.

The invention claimed is:

1. A computer system for processing risk information data comprising:
    an interview engine comprising
        a user data acquisition hardware engine configured to provide a graphical user interface to a user through which data can be input to the interview engine,
        an interview question database coupled to the user data acquisition hardware engine, the interview question database comprising a store of questions concerning risk exposure factors, and
        a cognitive logic processor coupled to the user data acquisition hardware engine and to the interview question database, the cognitive logic processor configured to select and present questions from the interview question database based on one or more answers to one or more previously presented questions from the interview question database and to map said answers to a user profile associated with a user providing said answers;
    a communication device configured to import data concerning risk insuring provisions and corresponding policy contract terms from one or more remote computer systems connected to the communication device by a network;
    a data storage device coupled to the interview engine and to the communication device, the data storage device storing data comprising
        a plurality of default risk profile records each associated with selected attributes of risk exposure factors,
        records configured to store data of risk insuring provisions and corresponding policy contract terms importable by the communication device,
        and
        a database comprising a plurality of user profile records each associated with a particular user, including risk insuring provisions and corresponding policy contract terms associated with that particular user; and
    a hardware decision engine coupled to the data storage device, the hardware decision engine comprising
        a first logic configured to create a user risk profile matching the risk exposure factors associated with answers mapped to a selected user profile,
        a second logic configured to select records from the data storage device that store data of risk insuring provisions and corresponding policy contract terms matching a risk exposure factor associated with a user risk profile, and
        a third logic configured to determine gaps between the risk exposure factors associated with a user risk profile and selected risk insuring provisions retrieved from the data storage device.

2. The computer system for processing risk information data of claim 1, in which the interview engine is configured to match default selection data input through the user data acquisition hardware engine to a default risk profile associated with the default selection data.

3. The computer system for processing risk information data of claim 2, in which the cognitive logic processor is configured to select and present questions from the interview question database based on the default risk profile associated with the default selection data.

4. The computer system for processing risk information data of claim 3, in which the first logic is further configured to create the user risk profile based on the default risk profile associated with the default selection data.

* * * * *